(12) United States Patent
Widmer et al.

(10) Patent No.: US 12,446,724 B2
(45) Date of Patent: Oct. 21, 2025

(54) DEVICE FOR THE PREPARATION OF A HOT BEVERAGE

(71) Applicant: Caffè A Mano GmbH, Stuttgart (DE)

(72) Inventors: Markus Widmer, Thun (CH); Thomas Liebe, Thun (CH)

(73) Assignee: Caffè A Mano GmbH, Stuttgart (DE)

( * ) Notice: Subject to any disclaimer, the term of this patent is extended or adjusted under 35 U.S.C. 154(b) by 688 days.

(21) Appl. No.: 16/790,438

(22) Filed: Feb. 13, 2020

(65) Prior Publication Data
US 2020/0260903 A1 Aug. 20, 2020

(30) Foreign Application Priority Data
Feb. 15, 2019 (EP) .................................... 19157505

(51) Int. Cl.
| | | |
|---|---|---|
| *A47J 31/38* | (2006.01) | |
| *A47J 31/44* | (2006.01) | |
| *A47J 31/46* | (2006.01) | |
| *A47J 31/52* | (2006.01) | |
| *A47J 31/54* | (2006.01) | |

(52) U.S. Cl.
CPC .......... *A47J 31/38* (2013.01); *A47J 31/4407* (2013.01); *A47J 31/4489* (2013.01); *A47J 31/461* (2018.08); *A47J 31/462* (2013.01); *A47J 31/468* (2018.08); *A47J 31/5251* (2018.08); *A47J 31/5253* (2018.08); *A47J 31/545* (2013.01); *A47J 2202/00* (2013.01)

(58) Field of Classification Search
CPC .... A47J 31/38; A47J 31/4407; A47J 31/4489; A47J 31/461; A47J 31/462; A47J 31/468; A47J 31/5251; A47J 31/5253; A47J 31/545; A47J 2202/00; A47J 31/542
See application file for complete search history.

(56) References Cited

U.S. PATENT DOCUMENTS

| | | | | | |
|---|---|---|---|---|---|
| 2,755,733 | A | * | 7/1956 | Arosio | ..................... A47J 31/24 99/305 |
| 4,353,293 | A | * | 10/1982 | Illy | ......................... A47J 31/36 99/302 R |
| 4,852,474 | A | * | 8/1989 | Mahlich | .............. A47J 31/4489 99/323.1 |
| 5,280,747 | A | * | 1/1994 | Bonneville | ............. A47J 31/36 99/302 R |
| 5,778,765 | A | * | 7/1998 | Klawuhn | .............. A47J 31/469 99/290 |

(Continued)

FOREIGN PATENT DOCUMENTS

| | | | |
|---|---|---|---|
| FR | 1174038 A | * | 3/1959 |
| WO | 2005079641 A1 | | 9/2005 |

(Continued)

OTHER PUBLICATIONS

European Application No. 19157505.9, European Search Report mailed Jul. 5, 2019, 2 pages.

*Primary Examiner* — Tiffany T Tran
(74) *Attorney, Agent, or Firm* — Hard IP LLC

(57) ABSTRACT

A device for the preparation of a hot beverage comprises a water reservoir, a flow heater and a brewing device. The water reservoir has a connection element for cold water. The water reservoir is fluidly connected to the flow heater, so that the flow heater can be filled with the cold water from the water reservoir.

15 Claims, 13 Drawing Sheets

(56) References Cited

U.S. PATENT DOCUMENTS

| | | | | |
|---|---|---|---|---|
| 7,377,207 B2* | 5/2008 | Hug | | A47J 31/402 |
| | | | | 99/289 P |
| 8,609,170 B2* | 12/2013 | Tinkler | | A47J 31/32 |
| | | | | 426/433 |
| 10,881,242 B2* | 1/2021 | Dionisio | | A47J 31/38 |
| 2004/0118292 A1* | 6/2004 | Font | | A47J 31/56 |
| | | | | 99/275 |
| 2006/0027103 A1* | 2/2006 | Boussemart | | F24H 1/121 |
| | | | | 219/214 |
| 2007/0227363 A1* | 10/2007 | Verna | | A47J 31/54 |
| | | | | 99/279 |
| 2007/0277676 A1* | 12/2007 | Crivellin | | A47J 31/38 |
| | | | | 99/288 |
| 2010/0221394 A1* | 9/2010 | Gaulard | | F24H 15/174 |
| | | | | 392/471 |
| 2011/0048243 A1* | 3/2011 | Bambi | | A47J 31/3671 |
| | | | | 99/300 |
| 2011/0127255 A1* | 6/2011 | Boussemart | | F24H 15/144 |
| | | | | 219/494 |
| 2012/0017767 A1* | 1/2012 | Samso Besora | | A47J 31/36 |
| | | | | 99/302 R |
| 2012/0073392 A1* | 3/2012 | Balc | | B25B 5/064 |
| | | | | 74/29 |
| 2012/0297772 A1* | 11/2012 | McBride | | F01B 23/00 |
| | | | | 60/649 |
| 2013/0243919 A1* | 9/2013 | Shrader | | A47J 31/32 |
| | | | | 426/433 |
| 2014/0208954 A1 | 7/2014 | Starr et al. | | |
| 2015/0201796 A1* | 7/2015 | Kuempel | | A47J 31/52 |
| | | | | 99/283 |
| 2016/0290698 A1* | 10/2016 | Dodson | | B61C 17/02 |
| 2019/0185189 A1* | 6/2019 | Neeser | | B65B 13/327 |
| 2021/0387759 A1* | 12/2021 | Neeser | | B65B 13/322 |

FOREIGN PATENT DOCUMENTS

| | | |
|---|---|---|
| WO | 2015073732 A1 | 5/2015 |
| WO | 2017009186 A1 | 1/2017 |

* cited by examiner

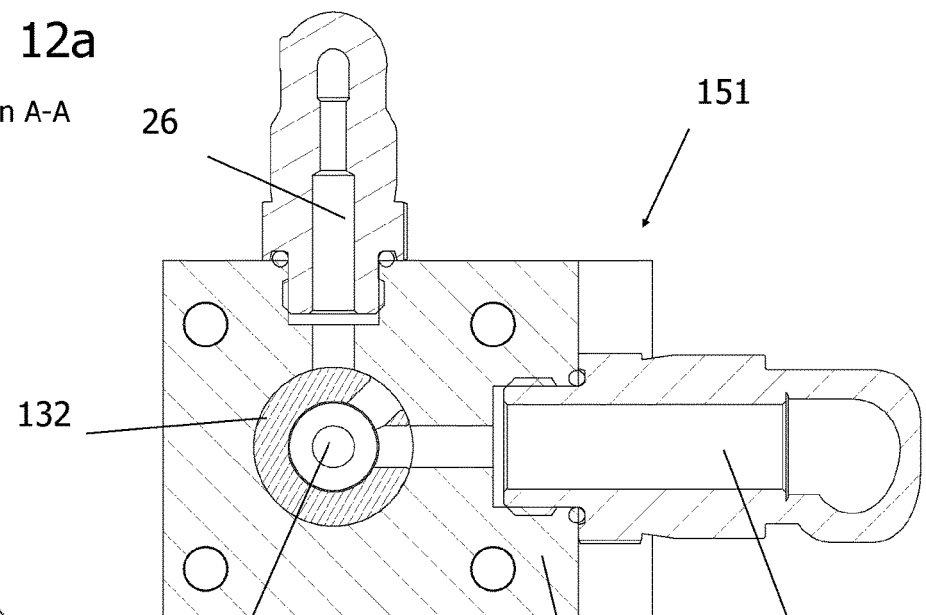
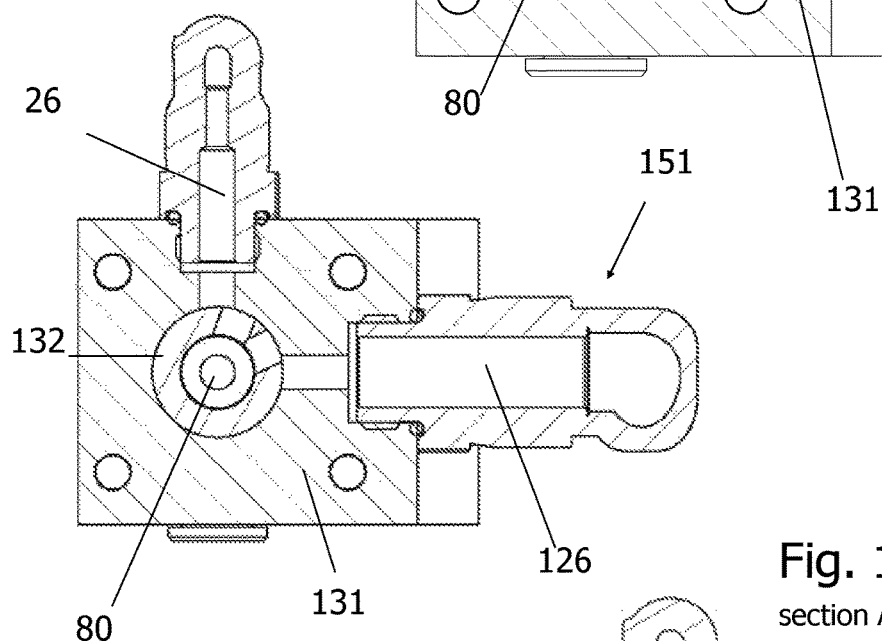
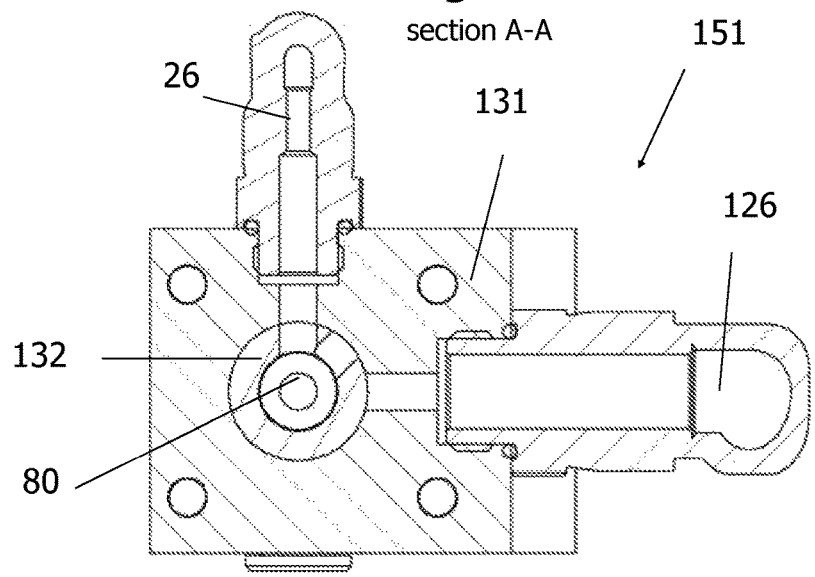

DEVICE FOR THE PREPARATION OF A HOT BEVERAGE

CROSS-REFERENCE TO RELATED APPLICATION

This application claims priority to European patent application no. EP19157505.9, filed on Feb. 15, 2019, the contents of which is incorporated herein by reference in its entirety.

BACKGROUND OF THE INVENTION

The present invention relates to a device for the preparation of a hot beverage, in particular a coffee machine. In particular, the invention relates to a device which comprises a manually operated lever for generating a water overpressure, which is suitable for the preparation of espresso. According to this exemplary embodiment, the lever serves to actuate a piston in a cylinder.

Usually, these coffee machines have an external boiler to heat the water up to 120 degrees Celsius or up to 130 degrees Celsius to generate steam. There is approximately 2 to 3 bar pressure in the boiler. The hot water is led from the boiler into a cylinder. A piston is arranged in this cylinder which can be moved in the cylinder by actuating the lever. When the piston is in its initial position, a filling volume limited by the piston and the cylinder walls is fed with hot water from the boiler. When the filling volume is filled with hot water, the lever is actuated to move the piston in such a way that the filling volume is reduced, the hot water being fed to a brewing vessel for the preparation of the coffee beverage. The boiler must therefore be preheated to provide sufficient hot water to fill the filling volume. A preheating time is therefore required for each coffee machine of this type to keep a sufficient supply of hot water in stock for the operation of the coffee machine.

Such a coffee machine therefore already consumes energy before it is in an operational state. Apart from the increased energy consumption, it has proven to be disadvantageous that the user has to plan a few minutes waiting time and have to put up with it until the coffee machine is ready for operation. In addition, water temperatures around 100 degrees Celsius are not particularly suitable for coffee preparation. The lack of any possibility to regulate the temperature is a further disadvantage of such coffee machines.

PRIOR ART

Such a coffee machine is known for example from WO2017/009186 A1. Hot water is produced in a boiler according to WO2017/009186 A1 and kept in stock. When the coffee machine is put into operation, the user actuates a lever by means of which a piston located in a cylinder carries out a lifting movement. There is an inlet for hot water in the cylinder wall. A hot water conduit leads from the boiler to this inlet. As soon as the piston has reached top dead center, the inlet can be opened and hot water can flow into the interior space of the cylinder. The hot water is directed by the downward movement of the piston from the filling space onto a beverage preparation, for example a powder, in particular a coffee powder, and pressed through the beverage preparation located on a carrier element.

A disadvantage of the previously known coffee machine lies in the preheating time required to heat the water in the boiler, so that a waiting time of up to a few minutes has to be accepted before the water in the boiler has reached the required temperature for preparing coffee.

This disadvantage is eliminated by means of the coffee machine according to WO2005/079641, in that only the amount of water required for the preparation of coffee is heated in a heating coil. For this purpose, the water is led through the heating coil and only the hot water supplied to the heating coil is used for the preparation of the coffee beverage. However, the heating coil itself is placed in a water bath, which must be kept at the temperature required for the heating coil. A preheating time must be accepted for heating the water bath when the coffee machine is started up.

According to FR 1174038, the piston chamber is surrounded by a heatable water bath. The water in the water bath warms the water in the piston chamber. According to this exemplary embodiment, the water in the water bath must be kept under an overpressure so that the temperature of the water in the piston chamber is high enough for the preparation of espresso. This solution therefore requires additional heating energy for the indirect heating of the water in the piston chamber in order to compensate for heat losses due to heat conduction via the chamber walls, that is to say the piston chamber walls and the outer walls of the water bath. This solution therefore has a higher energy consumption than the solution according to WO2005/079641.

A disadvantage of these aforementioned coffee machines lies in the increased energy consumption which arises for the preheating time and, if appropriate, for the continuous operation of the external or internal boiler if the coffee machine is not switched off if this preheating time is to be avoided. This means that energy is consumed even when the coffee machine is not in use for the preparation of the coffee beverage.

OBJECT OF THE INVENTION

It is an object of the invention to develop a device for the preparation of a hot beverage, which is ready for preparing the hot beverage immediately after being switched on, so that no or no noticeable preheating time is required.

Another object of the invention is to reduce the energy consumption for a device for the preparation of a hot beverage.

Another object of the invention is to provide a device for the preparation of a hot beverage, by means of which the flow can be precisely regulated.

Another object of the invention is to provide a device for the preparation of a hot beverage, by means of which the water temperature can be precisely controlled. In particular, an individual temperature can be set for each serving of coffee without waiting time.

SUMMARY OF THE INVENTION

The object of the invention is achieved by a device according to claim 1. Advantageous exemplary embodiments of the device are the subject of claims 2 to 15.

When the term "for example" is used in the following description, this term refers to exemplary embodiments and/or variants, which is not necessarily to be understood as a more preferred application of the teaching of the invention. Similarly, the terms "preferable", "preferred" are to be understood to refer to an example from a set of embodiments and/or variants, which is not necessarily to be understood as a preferred application of the teaching of the invention.

Accordingly, the terms "for example", "preferably" or "preferred" can refer to a plurality of exemplary embodiments and/or variants.

The following detailed description contains various exemplary embodiments for the coffee machine according to the invention. The description of a specific coffee machine is only to be regarded as an example. In the description and the claims, the terms "contain", "comprise", "have" are interpreted as "contain, but not limited to".

In the following, the term opening is used for openings of any cross-section. In particular, an opening can have a circular or oval cross section.

The term passage can be used for passages of any flow cross-section, in particular for channels with a rectangular, circular or oval flow cross-section. A fluid, that is to say in particular a liquid or a gas, in particular water or steam, can flow through these passages.

A device for the preparation of a hot beverage comprises a water tank, a flow heater and a brewing device, the water tank having a connection element for cold water, the water tank being connected in a fluid-conducting manner to the flow heater, so that the flow heater can be filled with the cold water from the water tank. In particular, the connection element serves to establish the fluid-conducting connection between the water tank and the flow heater.

The water tank comprises a tank bottom, a tank jacket and a tank lid. A piston is movably arranged in the water tank between an upper dead center and a lower dead center. In particular, the water tank contains a filling space for cold water, which is arranged between the piston and the tank bottom when the piston is not located in the bottom dead center. In particular, the filling space can be fluidly connected to the flow heater. The flow heater can be filled with the cold water from the filling space, so that a quantity of water corresponding to the filling volume can be fed into the flow heater.

The amount of water in the flow heater essentially corresponds to the amount of water in the filling space and thus the amount of hot beverage that can be produced with a single preparation. This means that only an amount of water corresponding to the beverage needs to be heated, which requires energy for a very short period of time. The period in which energy must be supplied can be less than a minute.

According to an embodiment, a connection element is provided upstream of the filling space for filling the filling space with cold water. The connection element can be connected to a water tank or water network connection through a water supply line. A check valve can be arranged in the connection element or in the water supply line. This check valve prevents water from being pushed back into the water tank or water supply connection when the piston is moved towards bottom dead center.

According to an embodiment, the connection element is provided with the inlet conduit to the filling space and an outlet conduit to the flow heater.

According to an embodiment, the connection element is arranged on the tank bottom. As a result, the tank jacket can remain completely free of connections, which leads to lower manufacturing costs for the tank jacket. In addition, a seal between the piston and the tank wall is easily possible if the tank wall contains no openings.

According to an embodiment, the water tank is designed as a cylinder. According to this embodiment, a movable piston is located inside the cylinder. The flow heater is filled with cold water from the cylinder in accordance with this embodiment. The water reservoir can include a separate water tank. A separate water tank can in particular be provided in order to provide a larger water supply, so that several hot beverages can be prepared with the device without refilling the water tank. The water tank can be configured as a container of a transparent material. The water tank can be made of glass or a transparent plastic or can contain glass or a transparent plastic. The water tank can be designed as a cylindrical container. The water tank can be detachably connected to the pressure vessel that contains the piston.

According to an embodiment, the brewing device contains a brewing valve. The brewing valve is intended to regulate the flow of hot water to the carrier element, so that the brewing time and the amount of water required for the preparation of the hot beverage can be adjusted according to the choice of the user. The use of the brewing valve has another advantage if the piston is operated manually by a swivel lever.

If the filling space of the water tank is to be filled, the piston is moved by the user from its position at or near bottom dead center to top dead center by actuating the swivel lever. According to an embodiment, the swivel lever is moved from an upper position to a lower position. During the stroke of the piston, cold water is let into or drawn into the filling space if the piston movement leads to a negative pressure in the filling space.

According to an embodiment, the stroke of the piston leads to compression of a spring element which can be arranged in the water tank between the piston and the tank lid. As soon as the user releases the swivel lever, the spring element would relax and the piston would suddenly be directed towards the bottom dead center, that is to say, towards its initial position, by the restoring force of the spring element. The swivel lever would also suddenly snap back to its rest position, which can be a risk of injury. When the system is filled with water, the water, as an incompressible medium, prevents the swivel lever from snapping back when the water is caught between the filling space and the brewing valve. This is particularly the case when the brewing valve is closed and a check valve is arranged upstream of the filling space. Between the brewing valve and the check valve, the water may build up in the inlet conduit, in the connection element, in the filling space in the outlet conduit, in the flow heater and in the supply conduit to the brewing valve.

The check valve in the connection element or in the inlet conduit to the pressure vessel prevents the water from flowing back into the water tank or into the inlet conduit. The water located downstream of the check valve must continue to flow towards the flow heater and the brewing valve because of the check valve. If the swivel lever is released when the brewing valve is closed, the water cannot escape and forms an incompressible lock, which means that the swivel lever essentially remains in its position. If the brewing valve is opened and hot water flows in the direction of the carrier element for the preparation of a hot beverage, the piston and thus also the swivel lever moves back towards its starting position, even if the brewing valve is completely open, but much more slowly than in a system that contains an air-filled filling space. The present arrangement thus fulfills the function of a liquid damper.

A defined water volume is contained in the filling space, in the outlet conduit, which extends from the filling space to the flow heater, in the flow heater and in the supply conduit from the flow heater to the brewing valve. After each piston stroke, water remains between the piston and the brewing valve. According to an embodiment, the length of all conduits is approximately 300 mm. If a pipe with an inner diameter of 2 mm is used, this results in approx. 1 ml water volume along this distance. According to this embodiment, there are contained 3.5 ml of water volume in the flow heater. The total water volume in all conduits between the filling space and the brewing valve amounts to no more than 5 ml.

When the device is filled for the first time, a little less water arrives at the carrier element than in the subsequent piston strokes, approximately 85 ml each are then to be expected.

If the filling space has a volume of approx. 85 ml, the filling volume amounts to 17 times the volume of the conduits. The influence of the conduits on the water pressure is low, so that even if the conduits do not contain any water, the piston is damped by the water in the filling space. Accordingly, the damping will be higher, if a lower flow rate through the brewing valve is selected by the user.

The brewing valve can be designed in particular as a flow control valve. In particular, the brewing valve contains a pressure sensor so that the user can determine the pressure of the hot water present in the brewing device.

According to an embodiment, the brewing valve comprises a valve body and a valve rod. The flow of hot water through the brewing device can be adjusted by means of the valve rod. According to an embodiment, the valve rod is connected to a lever which can be manually operated by the user to set the desired flow in the brewing device.

According to an embodiment, a piston rod is provided, on the lower end of which the piston is attached. In particular, the piston rod can have an upper end which is connected to a swivel lever in such a way that the piston rod can be moved relative to the water tank by actuating the swivel lever. The swivel lever can be swiveled by an angle of up to 150°.

According an embodiment, the piston rod contains a rack at the upper end. In particular, the swivel lever for actuating the piston can contain a gear. In particular, the gear can be in engagement with the rack. According to an embodiment, a tooth rocker can be arranged between the gear and the rack in order to transmit the movement from the gear to the rack.

According to one embodiment, a spring element is arranged in the water tank between the tank lid and the piston. By means of the spring element, the piston can move from top dead center to bottom dead center when the user releases the swivel lever. The swivel lever automatically moves back to the starting position because the piston is coupled to the swivel lever via the piston rod, the associated rack, the tooth rocker and the gear.

According to each of the embodiments, the brewing device, in particular the brewing valve, can be arranged between the flow heater and a carrier element. In particular, the brewing device can contain a shower. According to an embodiment, the shower is connected to a distribution grid. All components of the brewing device can be made of poorly heat-conducting material. In particular, plastics can be used. This ensures that the heat transfer to the environment can be kept low during the brewing process, so that hardly any heat losses occur.

According to each of the embodiments, the device can contain a steam generating device for generating steam. In particular, the steam generating device can comprise a flow heater and a steam valve. According to an embodiment, a lever is provided for the manual actuation of a steam valve, so that a quantity of water corresponding to the desired quantity of steam is fed to the flow heater, the amount of water being evaporated in the flow heater. In particular, the steam can be conducted from the water heater through a steam line to a nozzle. The nozzle contains a plurality of orifices which increase the flow rate of the steam. In particular for the application for frothing milk, the circulation of the milk can be promoted by the use of the nozzle and thus the foaming process can be improved.

In particular, coffee, tea, hot cocoa, hot chocolate or steam can be prepared using the device according to one of the embodiments. In particular, the device can be used to prepare espresso.

The device can contain an adjusting element for regulating the temperature, that is to say a temperature controller. In particular, the temperature controller has the advantage that it is possible to extract each portion of the hot beverage at an individual temperature. This means that a tempered water reservoir is not required. The extraction temperature can be changed any time without delay. Therefore, the device can always be cold as long as it is not put into operation. The device is only switched on when a hot beverage is to be prepared, and only then energy is required to operate the device.

The water tank of a device according to one of the preceding exemplary embodiments can comprise a water tank or a water supply line and a pressure vessel. In particular, a check valve can be arranged between the water tank or the water supply line and the pressure vessel.

The present device is thus characterized by a very small carbon dioxide footprint in operation, since it can be used in a very energy-saving manner.

BRIEF DESCRIPTION OF THE DRAWINGS

The device according to the invention is illustrated below according to a few exemplary embodiments. It is shown in
FIG. 1 a view of a device according to an embodiment,
FIG. 2 a view of the device according to the embodiment shown in FIG. 1 from the opposite side,
FIG. 3 a section through the device according to the embodiment shown in FIG. 1,
FIG. 4 a detail of a brewing device for a device according to FIG. 1,
FIG. 5 a steam generating unit for a device according to FIG. 1,
FIG. 6 a schematic illustration of a device according to FIG. 1,
FIG. 7 an embodiment of a device with a water reservoir,
FIG. 8 a schematic illustration of a variant of a device according to FIG. 1,
FIG. 9 a schematic illustration of a third embodiment of the device,
FIG. 10 a schematic illustration of a fourth embodiment of the device,
FIG. 11 a view of a variant for a steam generating device,
FIG. 12a a sectional view of a steam valve for the steam generating device in a first position,
FIG. 12b a sectional view of the steam valve for the steam generating device in a second position,
FIG. 12c a sectional view of the steam valve for the steam generating device in a third position,
FIG. 13 a perspective view of the steam generating device according to FIG. 11.

DETAILED DESCRIPTION OF THE DRAWINGS

Figure 1:
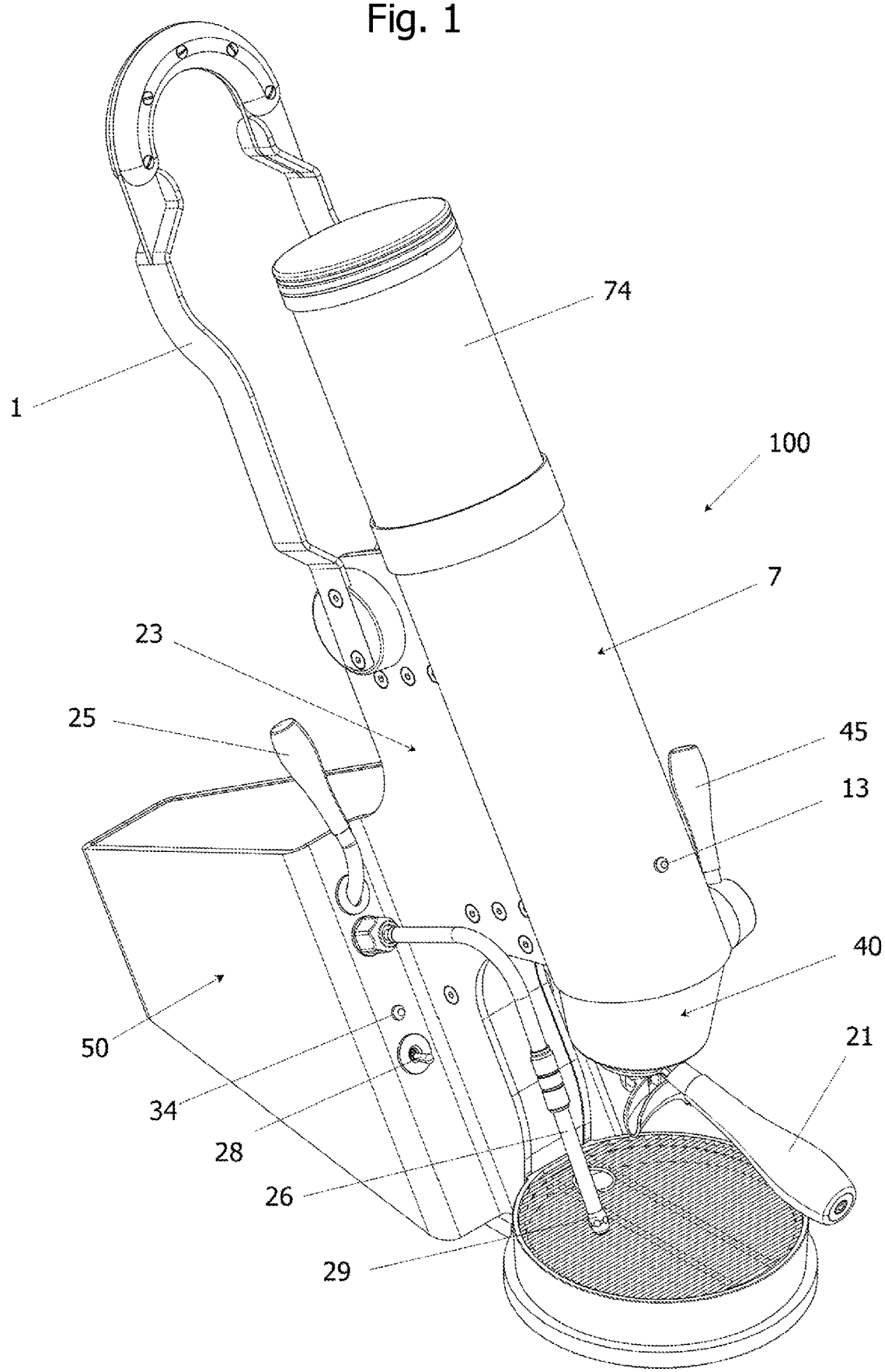

FIG. 1 shows a view of a device 100 according to a first exemplary embodiment. A device for the preparation of a hot beverage comprises a water tank 7, a flow heater 23 (see FIG. 3) and a brewing device 40. The water tank 7 has a connection element for cold water. The water tank 7 is fluidly connected to the flow heater 23, so that the flow heater 23 can be filled with the cold water from the water tank 7. The device 100 comprises in particular a water tank 7, a piston 14 which is movable in the water tank 7 and which is not visible here, a flow heater 23 and a brewing device 40. The connection element 22 to the water tank 7 has in particular an inlet for cold water and an outlet for cold water, the outlet being connected in fluid-conducting manner, for example via a drain conduit 75, to the flow heater 23. The flow heater 23 can thus be filled with the cold water from the water tank 7 via the drain conduit 75.

The device 100 includes a steam generating device 50 for generating steam. In particular, the steam generating device 50 can comprise a flow heater 27 and a steam valve 51 (see FIG. 5). According to an embodiment, a lever 25 is provided for the manual actuation of a steam valve 51, so that a quantity of water corresponding to the desired quantity of steam is supplied to the flow heater 27, the water quantity in the flow heater 27 being brought to evaporation. In particular, the steam can be conducted from the flow heater 27 through a steam line 26 to a nozzle 29.

Figure 2:
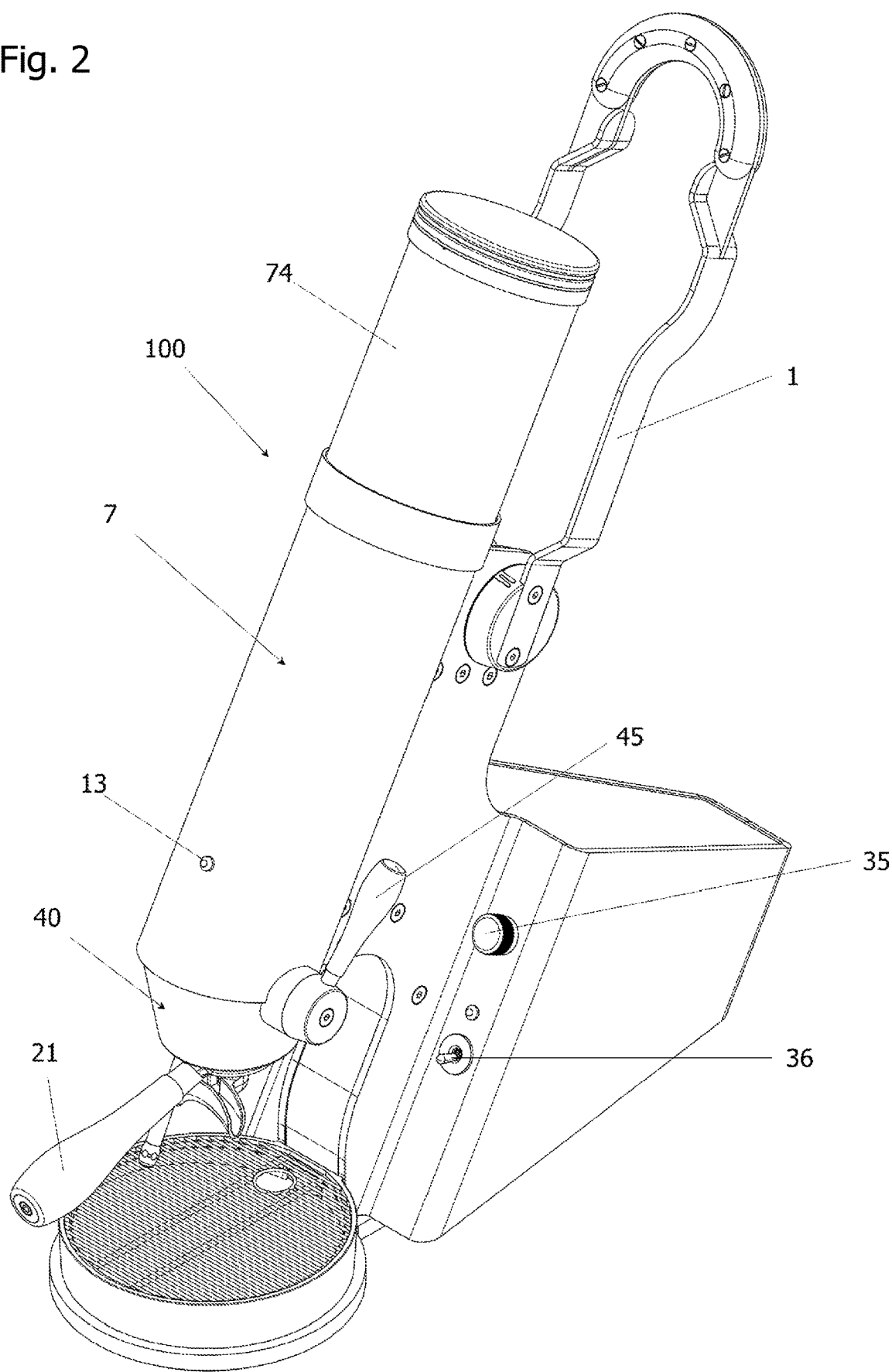

FIG. 2 shows a view of the device according to the embodiment shown in FIG. 1 from the opposite side. The device 100 for the preparation of a hot beverage comprises a water tank 7, a flow heater 23 (see FIG. 3) and a brewing device 40, the water tank 7 having a connection element 22 (see FIG. 3) for cold water. The water tank 7 is connected in a fluid-conducting manner to the flow heater 23, so that the flow heater 23 can be filled with the cold water from the water tank.

The device can have an adjusting element 35 for setting the desired operating temperature. The operating temperature can correspond in particular to the water temperature of the water in the hot water conduit 77 to the brewing device. A main switch 36 may be provided to disconnect the device from the power supply.

Figure 3:
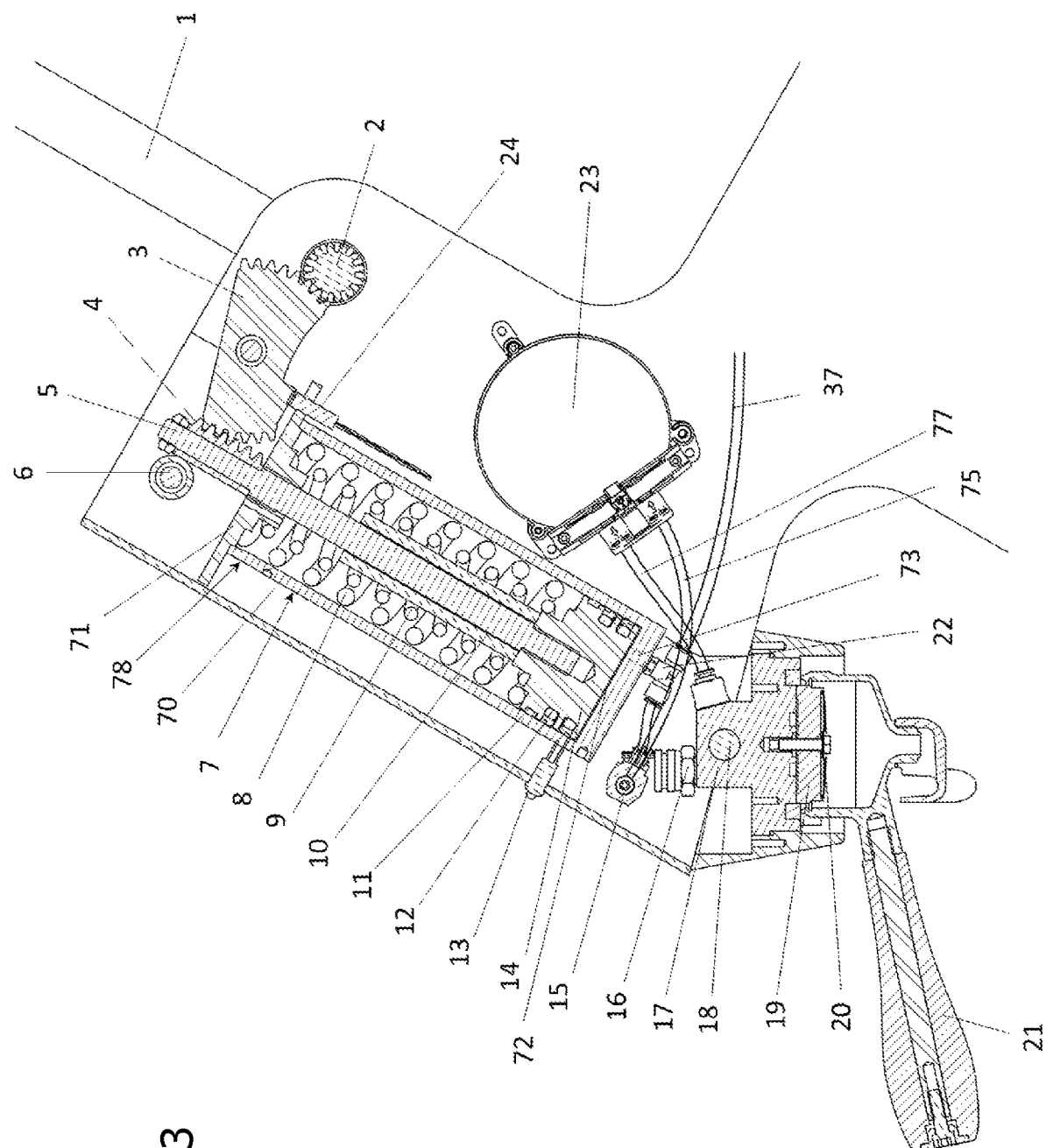

FIG. 3 shows a section through the device according to the embodiment shown in FIG. 1. According to FIG. 3, the water tank 7 comprises a tank bottom 72, a tank jacket 70 and a tank lid 71, a piston 14 being movably arranged in the water tank 7 between an upper dead center and a lower dead center. The water tank 7 contains a filling space for cold water, which is arranged between the piston 14 and the tank bottom 72 when the piston 14 is not at bottom dead center. The filling space is fluidly connected to the flow heater 23. The flow heater 23 can be filled with the cold water from the filling space, so that an amount of water corresponding to the filling volume can be fed into the flow heater 23. The connection element 22 is arranged on the tank bottom 72. The connection element 22 can comprise an inlet and an outlet. According to an exemplary embodiment (not shown), different openings can be provided for the inlet and the outlet.

According to the embodiment shown in FIG. 3, the brewing device 40 contains a brewing valve 41. The brewing valve 41 contains a pressure sensor 16 as well as a valve body 17 and a valve rod 18. The valve rod 18 is connected to a lever 45 which is manually operable by the user to set the desired flow in the brewing device 40.

The water tank 7 contains a piston rod 5, at the lower end of which the piston 14 is attached. A spring element 8, 9 is arranged in the water tank 7 between the tank lid 71 and the piston 14. The piston rod 5 protrudes through the tank lid 71 and is thus guided through the tank lid 71. The piston rod 5 has an upper end which is connected to a swivel lever 1 such that the piston rod 5 can be moved relative to the water tank 7 by actuating the swivel lever 1. The piston rod 5 has an upper end, which contains a rack 4. The swivel lever 1 contains a gear 2, the gear 2 being in engagement with the rack 4. The gear 2 can in particular be fastened on the swivel lever 1, for example flanged thereon. According to the present exemplary embodiment, a tooth rocker 3 is arranged between the gear 2 and the rack 4 in order to transmit the movement from the gear 2 to the rack 4.

The preparation of the hot beverage is initiated by moving the swivel lever 1 extending in the direction of the front of the device 100 from top to bottom. The swivel lever 1 is provided with a gear 2, which transmits the rotational movement of the swivel lever 1 via a tooth rocker 3 to a rack 4, which is attached to a piston rod 5. The piston rod 5 is fastened to a piston 14 at the end opposite the rack 4. The piston 14 is movable in the water tank 7 when the rack 3 is moved by the actuation of the swivel lever 1 such that the piston 14 is moved in the direction of the top dead center in the water tank 7. According to the present exemplary embodiment, the piston 14 is therefore moved from bottom dead center to top dead center.

The rack 4 is mounted in the housing of the device 100 by means of a support 6 in order to avoid any bending of the rack 4, which would occur when forces are transmitted from the tooth rocker 3 to the rack 4 when the swivel lever 1 as shown in the present illustration is moved downwardly.

When the swivel lever 1 is moved downwardly, the piston 14 is moved in the water reservoir 7. The water reservoir 7 in the present exemplary embodiment comprises a water tank 74 which has a tank jacket 70 which is delimited by an upper end, the tank lid 71 and a lower end which is delimited by the tank bottom 72. The tank jacket 70 can in particular have the shape of a cylinder.

During the lifting movement, the piston 14 is moved away from the tank bottom 72, on which the piston 14 can rest in its rest position. According to the present embodiment, a gap between the tank bottom 72 and the piston 14 is also provided in the rest position of the piston 14. A filling space is therefore created between the tank bottom 72 and the underside of the piston 14, which is filled with water when the piston 14 moves in the direction of top dead center, that is to say upwards, in accordance with the present illustration. The rest position of the spring system which consists of the spring elements 8, 9 is defined according to the present exemplary embodiment with the lower end of the rack 4 and the tank lid 71. The spring elements 8, 9 are prestressed between the piston 14 and the tank lid 71 and are held in position above the rack 4 with fastening elements, for example nuts.

A spring element 8, 9 is arranged in the interior of the water reservoir 7 between the top of the piston 14 and the tank lid 71. According to the present embodiment, the spring element 8, 9 consists of a first spiral spring 8 and a second spiral spring 9, which are arranged concentrically to one another. In the present illustration, the spiral spring 9 is located within the spiral spring 8. During the lifting movement of the piston 14 in the direction of the top dead center, the spring element 8, 9 is compressed.

As soon as the piston 14 moves away from the tank bottom 72 of the water reservoir 7, an opening 73 is exposed, which is in fluid-conducting connection with a connection element 22 for cold water. If a gap remains between the piston 14 and the tank bottom 72 when the piston is at bottom dead center, the opening 73 is not sealed. This variant has the advantage that the filling space can be flushed without the swivel lever 1 having to be moved. Cold water can penetrate into the filling space created by the stroke movement of the piston 14. The connection element 22 may include a check valve, not shown, which prevents the cold water that flows into the filling space from being pushed back into the connection element 22 or the inlet conduit 37 when the piston 14 returns to its original position when the spring element 8, 9 relaxed. The check valve can be inserted into the inlet conduit 37 and connected to the connection element 22, for example by a hose. The starting position is understood as the bottom dead center of the piston 14. At the top dead center of the piston, the compression of the spring element 8, 9 has its maximum value.

The movement of the tooth rocker 3, which takes place when a user moves the swivel lever 1, is detected by an inductive sensor 24. As soon as the inductive sensor 24 detects such a movement, the flow heater 23 is switched on. In the flow heater 23, the heating elements located therein are preheated, which serve to heat the liquid in the flow heater 23, i.e. especially water. The preheating can be displayed to the user, for example by a signal lamp 13, a temperature display or an acoustic signal. In the present case, a signal lamp 13 is provided. For example, the signal lamp can emit a flashing signal until the desired temperature is reached. The signal lamp 13 can also indicate the progress of the preheating to the user by changing the luminous color.

The preheating time can in particular essentially correspond to the duration of the stroke movement of the piston 14. The piston 14 has a circumferential seal 12 and can comprise a slide ring 11 for guiding the piston 14, wherein a low friction sliding of the piston 14 in the tank jacket 70 of the water tank 7 can be supported. The seal 12 prevents water from entering the space in which the spring element 8, 9 is located. A plurality of such seals 12 can also be provided; in the present exemplary embodiment, two seals 12 are used.

The water is thus sucked into the filling space during the stroke movement of the piston 14. It would also be possible according to an embodiment not shown to inject the water into the filling space.

The piston stroke can be limited by means of a stroke limiting element 10. According to the present exemplary embodiment, the stroke limiting element 10 is designed as a pipe which is arranged on the piston rod. According to an embodiment not shown, the stroke limiting element 10 can also be designed as a stop for the swivel lever 1. As an alternative or in addition thereto, the spring element can be dimensioned such that it exerts such a large force on the piston that a further stroke is not possible or is only possible with an unusually great effort exerted by the user. The pipe can contain a plastic or consist of plastic. According to the present exemplary embodiment, the pipe extends around the piston rod 5 and runs inside the spring element 8, 9.

As soon as the swivel lever 1 is released by the user, the spring element 8, 9 relaxes and the piston 14 moves back into its starting position. The water in the filling space is fed into the drain conduit 75, which leads to the flow heater 23. A flow sensor 15 can be arranged between the opening 73 and the inlet connection in the flow heater 23 in the drain conduit 75. The flow can be measured continuously by the flow sensor 15. Thus, the amount of energy required for the flow heater, which is required to keep the water temperature constant, can be continuously calculated.

In the flow heater 23, the water is heated to the operating temperature which is required for the preparation of the hot beverage. The operating temperature can be set to the desired temperature by the user using an adjusting element 35 (see FIG. 2), for example a potentiometer.

According to the present exemplary embodiment, the flow heater 23 has a heated channel 42. The heat is transferred from heating elements 43, which are arranged on or in the channel wall, to the liquid flowing in the channel. The liquid flowing through the channel, in particular water, heats up and at least reaches the brewing temperature when it leaves the flow heater 23 via the hot water conduit 77. The flow heater 23 can correspond to the flow heater 27 shown in FIG. 5. The flow heater 23 can differ in size from the flow heater 27. Since more energy is required for the evaporation of the water in the steam generating device 50, the flow heater 27 installed for this purpose is larger than the flow heater 23. Each of the flow heaters 23, 27 thus has a connection element for a water supply line, a channel and a connection for a hot water conduit 77 or a steam line 26. The channel runs between the connection element for the water supply line and the connection for a hot water conduit 77 or the connection for the steam line 26.

Figure 4:
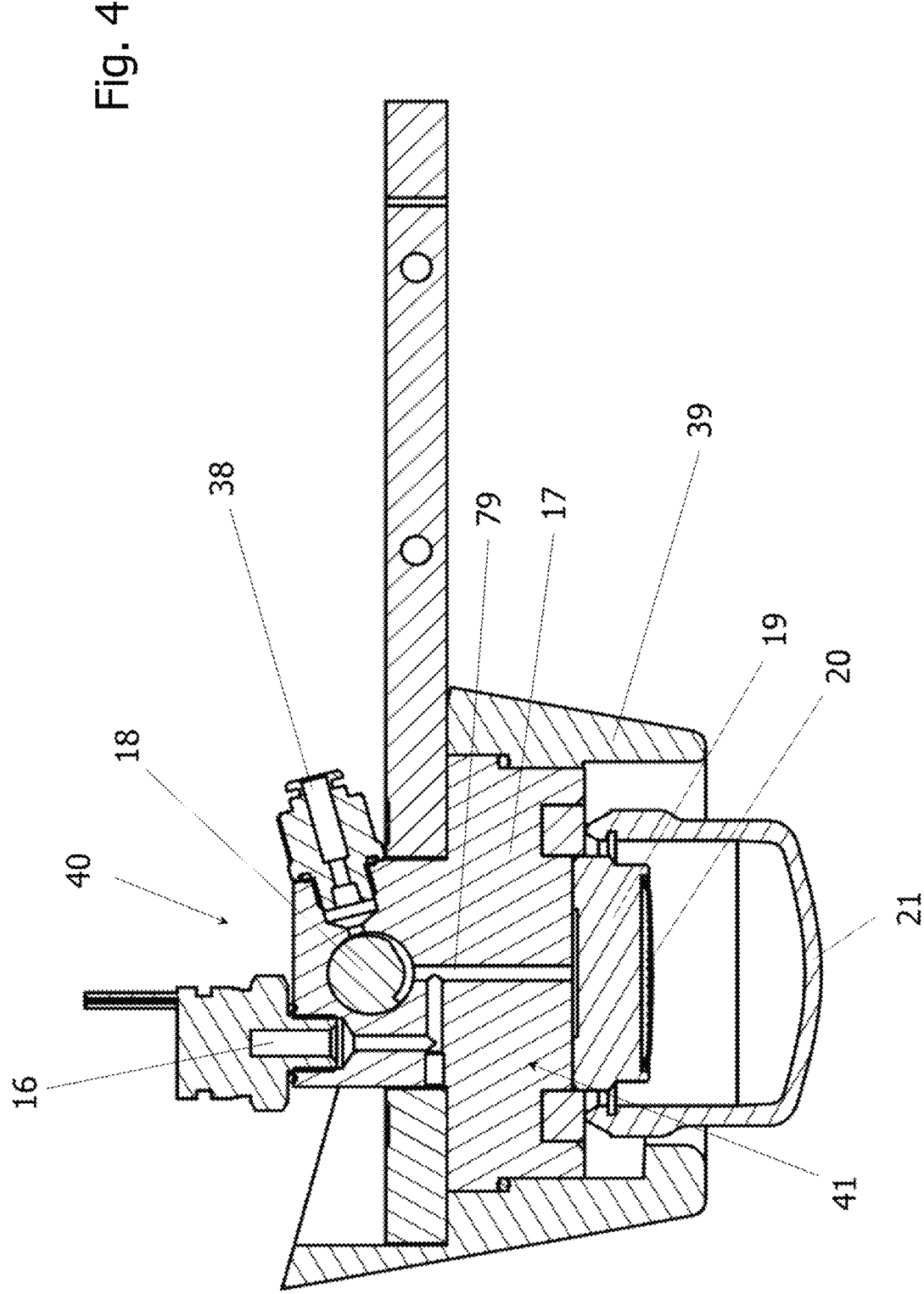

In FIG. 4, the brewing device 40 is shown in a sectional view. The hot water conduit 77 shown in FIG. 3 is in fluid-conducting connection with the connection element 38. It is omitted in FIG. 4, therefore not visible there. The connection element 38 is arranged on the valve body 17 of a brewing valve 41. The brewing valve 41 comprises the valve body 17 and a valve rod 18. The valve body 17 can in particular form a valve housing. The valve body can contain PTFE or consist of PTFE.

Depending on the position of the valve rod 18 in the valve body 17, the flow rate of the hot water can be changed, that is to say the flow rate per unit of time. The position of the valve rod 18 is changed with the lever 45 by rotating the valve rod 18. The brewing valve 41 can in particular be designed for a flow rate of 2 to 10 ml/s inclusive. According to an exemplary embodiment, six positions are available, for example, which can be set with a noticeable grid: closed, approx. 2 ml/s, 4 ml/s, 6 ml/s, 8 ml/s, 10 ml/s.

The hot water reaches the shower 19 through the opening 79 in the valve body 17. The shower 19 can contain PEEK or consist of PEEK. The hot water is distributed from the shower 19 to the distribution grid 20. The hot water is distributed there to an ingredient for the hot beverage, for example coffee powder, which is located in the carrier element 21. The carrier element 21 can be detachably received in a carrier element receptacle 39. For example, a bayonet lock can be provided to receive the carrier element 21 in the carrier element receptacle 39. The carrier element 21 can contain a sieve.

According to the present exemplary embodiment, the water is distributed over a plurality of channels in the gap above the shower 19. For example, six channels for distributing the hot water can be provided in the shower 19. The hot water is passed through the channels to the distribution grid 20. The channels in the shower 19 and in the valve body 17 are not in the plane of the drawing, therefore they are not visible in FIG. 4. The sieve in the carrier element 21 is also not visible in FIG. 4. The hot water is distributed to a beverage preparation, for example coffee powder, by means of the distribution grid 20. At the same time, the distribution grid 20 prevents the beverage preparation from entering the brewing device 40.

A pressure sensor 16 is provided in the valve body 17, by means of which the water pressure in the opening 79, which leads to the shower 19, can be detected. The pressure sensor can be used to measure how the pressure is built up when the piston 14 moves from top dead center to bottom dead center, whereby the spring element 8, 9 relaxes. This pressure is not the same as the pressure between the brewing valve 41 and the piston 14 when the brewing valve 41 is closed. Of course, the piston 14 causes build-up of the pressure. However, the beverage preparation in the carrier element 21 has a significant influence on the measured pressure curve in the opening 79, since the permeability of the bulk material constituting the beverage preparation changes greatly in the course of the extraction. At the beginning, there is no back pressure, because the empty space above the beverage preparation is initially slowly flooded. Then the beverage preparation swells and ingredients begin to dissolve, thus leading to a massively higher flow resistance. Only at this moment, the pressure in the carrier element 21 will increase. Towards the end of the extraction, it can be expected that the pressure above and below the brewing valve 41 is the same.

If the water pressure rises, this can be indicated to the user, for example via a pressure display or a color change of a signal lamp. According to an embodiment, the build-up of pressure is indicated by a color change in the signal lamp 13. Alternatively, the build-up of pressure can be shown on a display as a numerical value or in graphic form. For example, the build-up of pressure can be shown in a graphic on a display depending on the time. The display can be located on the device itself or a wireless connection can be established with a display device, on which the pressure signals determined by the pressure sensor are converted into a form that can be read by the user and are displayed on the display of the display device. The display device can be, for example, a monitor, a tablet, a smartwatch or a smartphone. As an alternative or in addition to this, the time course of the color change of the signal light can be recognized by the user through a periodic signal. For example, the signal lamp can have a flashing mode. In particular, the signal lamp can be in the blinking mode during the build-up of pressure or during the brewing process. The period in flashing mode can be, for example, one second. A further change in the color of the signal lamp can indicate that the maximum pressure has been reached. A pulsating signal can be generated during the extraction process, which signal is determined, for example, by calculation using a processor. According to an embodiment, the period of the pulsating signal can be one second. According to an embodiment, the frequency of the signal is 60 bpm or 1 Hz.

The user can thus easily determine the duration of the extraction process by counting the number of signals, each signal corresponding to a time period of one second.

When the piston 14 executes the maximum stroke, a maximum water mass of 85 g can pass through the flow heater 23 and the brewing valve 41 with a single stroke movement.

The flow can be controlled manually by means of the brewing valve 41, which is referred to below as flow profiling. Only the brewing valve 41 is used for flow profiling. The barista sets different valve positions for certain times by operating the lever 45. For example, the position of the lever 45 can be in position 1 for 5 s, then in position 4 for 3 s, in position 2 for 10 s and in position 6 for the rest of the extraction. This setting is only mentioned here as an example for a multitude of setting options for the two parameters flow and time, which are relevant for flow profiling.

Figure 5:
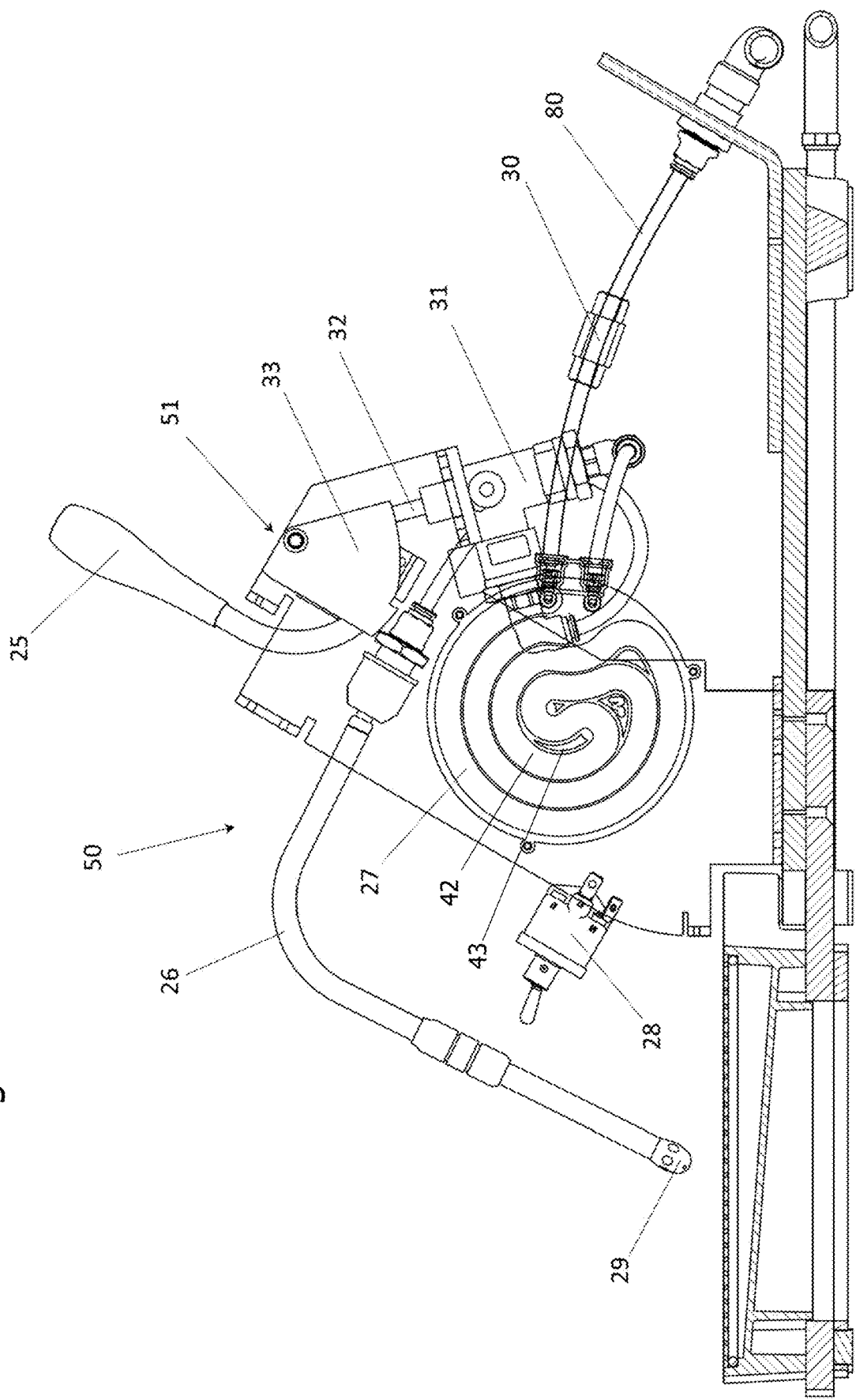

FIG. 5 shows a steam generating device 50 for a device according to one of the preceding figures.

The steam generation is triggered by operating the switch 28. Alternatively, steam can also be generated automatically after the hot beverage has been prepared. A flow heater 27 provided for steam generation is preheated. A fluid conduit 80 can lead from the water reservoir 7 to the flow heater 27 if the water reservoir 7 contains a water tank. The fluid conduit 80 can also be connected to a water supply line, not shown. The flow heater 27 can be ready for operation within 3 seconds. The water can be supplied to the flow heater 27 by means of a fluid conduit 80. A pump can be used to increase the water pressure, which is not shown in FIG. 5, when the water has to be pumped out of the water tank 74. Such a pump can also be started by operating the switch 28. The fluid conduit 80 may include a steam valve 51 located downstream of the flow heater 27.

The steam generating device 50 comprises a lever 25 for a steam valve 51. By actuating the lever 25, a valve lifter 32 can be actuated, which is arranged in a valve body 31 of the steam valve 51. In particular, a cam 33 is actuated by means of the lever 25. The cam 33, which is attached to the lever 25, in particular is flanged to the lever 25, performs a rotary movement. The valve lifter 32 is in contact with the surface of the cam 33, so that the rotary movement of the cam 33 causes a displacement of the valve lifter 32 in the valve body 31, as a result of which the inflow of water to the flow heater 27 is released. Any water in the flow heater 27 is removed in the process.

The amount of water flowing through the flow heater 27 is continuously measured by a flow sensor 30. The amount of heat required in the flow heater 27 is calculated by a processor on the basis of the amount of water measured by the flow sensor 30 and adapted accordingly. The water leaves the flow heater 27 in the vapor state, in particular it can be completely evaporated. The steam is passed through a steam line 26 and leaves it through a nozzle 29.

The steam line is preferably made of a material with low thermal conductivity. For example, the steam line can contain a plastic or consist of plastic. According to an exemplary embodiment, which is not shown, the steam temperature can also be changed by means of a potentiometer.

The flow heater 27 can be switched off automatically after a certain operating time. For example, the switch 28 can be a non-latching switch or button, which springs back into the original position immediately after actuation. Only pulses should be performed with this switch 28. A non-latching switch has a rest position, can be brought out of this into a switch position, but then springs back automatically into the rest position. An advantage of a system that includes a non-latching switch is that it saves electrical energy. With a non-latching switch, the automatic switch-off can be forced after a certain period of time, whereby this period of time can be very short.

Instead of a non-latching switch, a switch can be used, by means of which hot water can be provided instead of steam by the steam generating device 50, for example for the preparation of tea beverages.

According to an exemplary embodiment (not shown), the flow heater 27 can be switched off manually by the user actuating the switch 28, that is to say the energy supply to the heating elements of the flow heater can be interrupted. Any pump can also be switched off automatically or by actuating the switch 28. In particular, the flow heater 27 and/or the pump can be switched on or off by a pulse from the switch 28.

A display element 34 can be provided for displaying the operating state of the steam generating device 50, see FIG. 1. For example, the display element 34 can be designed as a control lamp or signal lamp. The display element 34 can light up, for example, when the steam generating device 50 is in operation.

Figure 6:
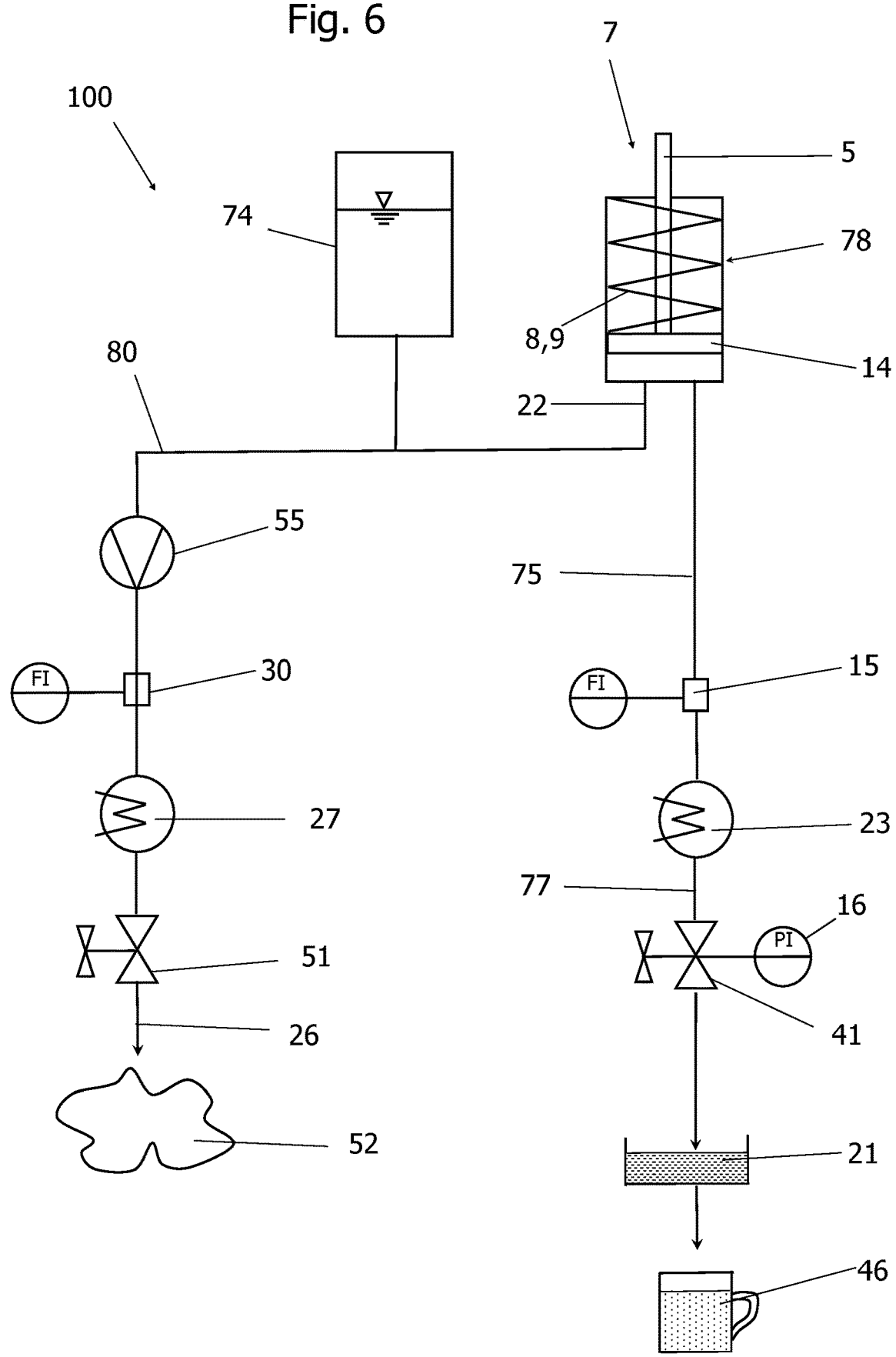

FIG. 6 shows a schematic illustration for a method carried out in a device 100 according to one of the preceding embodiments for the preparation of a hot beverage 46 or the preparation of steam 52.

The present device 100 has a water reservoir 7, which comprises a water tank 74 and a pressure vessel 78. The pressure vessel 78 can be designed as a cylinder. A piston 14, which can be designed according to one of the preceding exemplary embodiments, can be displaced in the pressure vessel 78. The piston 14 is connected to a piston rod 5, by means of which the piston 14 can be displaced in the pressure vessel 78. The piston 14 divides the interior of the pressure vessel 78 into a filling space and an empty space. The filling space can be filled with water from the water tank 74. The empty space can contain one or more spring elements 8, 9.

The filling space contains a connection element for water, which can reach the filling space via a water supply line from the water tank. The water is in particular neither heated in the water tank nor in the water supply line nor in the connection element 22. The water is pushed out of the filling space when the piston 14 moves towards the bottom dead center and thus the volume of the filling space decreases. The water reaches the drain conduit 75 from the filling space, which leads to the flow heater 23. A flow sensor 15 is located in the discharge conduit 75, by means of which the flow in the drain conduit 75 can be measured. In the flow heater 23, the water is heated to the brewing temperature. The brewing temperature can be preset by the user via an adjusting element 35 (see FIG. 2). The hot water generated in the flow heater 23 is supplied to the brewing device 40 via the hot water conduit 77.

The brewing device 40 comprises a brewing valve 41. The brewing valve 41 can be operated manually by the user, for example by means of the lever 45 shown in FIG. 2. The brewing valve has a pressure sensor 16, by means of which the pressure of the hot water located in the brewing valve 41 can be measured. The pressure measured by the pressure sensor 16 can be displayed to the user, for example with the signal light shown in FIG. 1. The user can change the flow of the hot water through the brewing valve 41 according to the displayed pressure to allow the preparation of the hot beverage at the desired pressure. The hot water is conducted from the brewing valve 41 to a carrier element 21, for example a filter carrier or sieve carrier. In the carrier element 21 there is deposited a beverage preparation, for example coffee powder, so that a hot beverage 46 can be prepared, for example by extracting or dissolving constituents of the beverage preparation in the hot water.

Alternatively, steam can be generated with the device 100. To generate steam, cold water can be removed from the water reservoir 7, in particular from the water tank 74, according to the present exemplary embodiment.

The cold water is conducted in a fluid conduit 80 to a flow heater 27. A pump 55 can be arranged in the fluid conduit 80. A flow sensor 30 can also be arranged in the fluid conduit 80, in particular between the pump 55 and the flow heater 27.

The cold water is brought to evaporation in the flow heater 27. The steam generated in the flow heater 27 is fed through a steam valve 51 into a steam line 26. The steam line 26 can open into a nozzle from which the steam 52 emerges.

Figure 7:
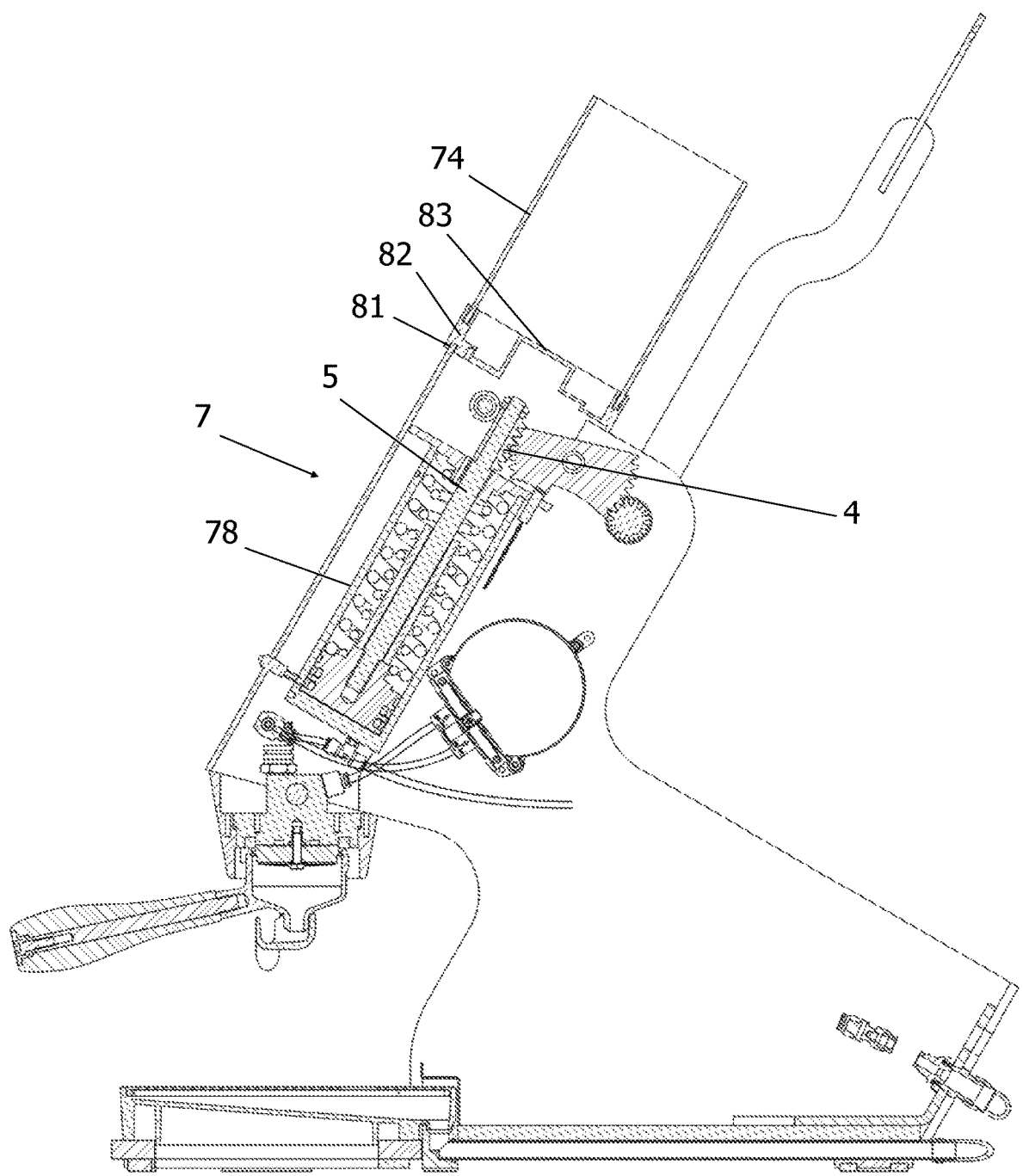

FIG. 7 shows an embodiment of a device 100, according to which the water reservoir 7 comprises a water tank 74 and a pressure vessel 78. The water tank 74 is arranged above the pressure vessel 78. The pressure vessel 78 has the same construction as the pressure vessel 78 according to FIG. 3, so that the same reference for the pressure vessel can be used as in the description of FIG. 3. The water tank 74 has a reservoir bottom 82, which can have an engagement element 81, which is used for the positive connection to the tank jacket 70 of the pressure vessel. The engagement element 81 can be designed, for example, as a groove. The engagement element 81 can also comprise a pin. In particular, a plurality of pins can be provided. The pin may contain a magnet at its lower end or a metal element which can be attracted by a magnet located on the pressure vessel 78 so that the water tank 74 cannot move.

The reservoir bottom 82 can have a depression 83 on the underside facing the pressure vessel 78. The depression 83 serves to create sufficient space for the movement of the rack 4 and the piston rod 5. The water tank 74 can be open on the upper side or can be closed by a lid, which is shown in FIG. 1 or FIG. 2.

Figure 8:
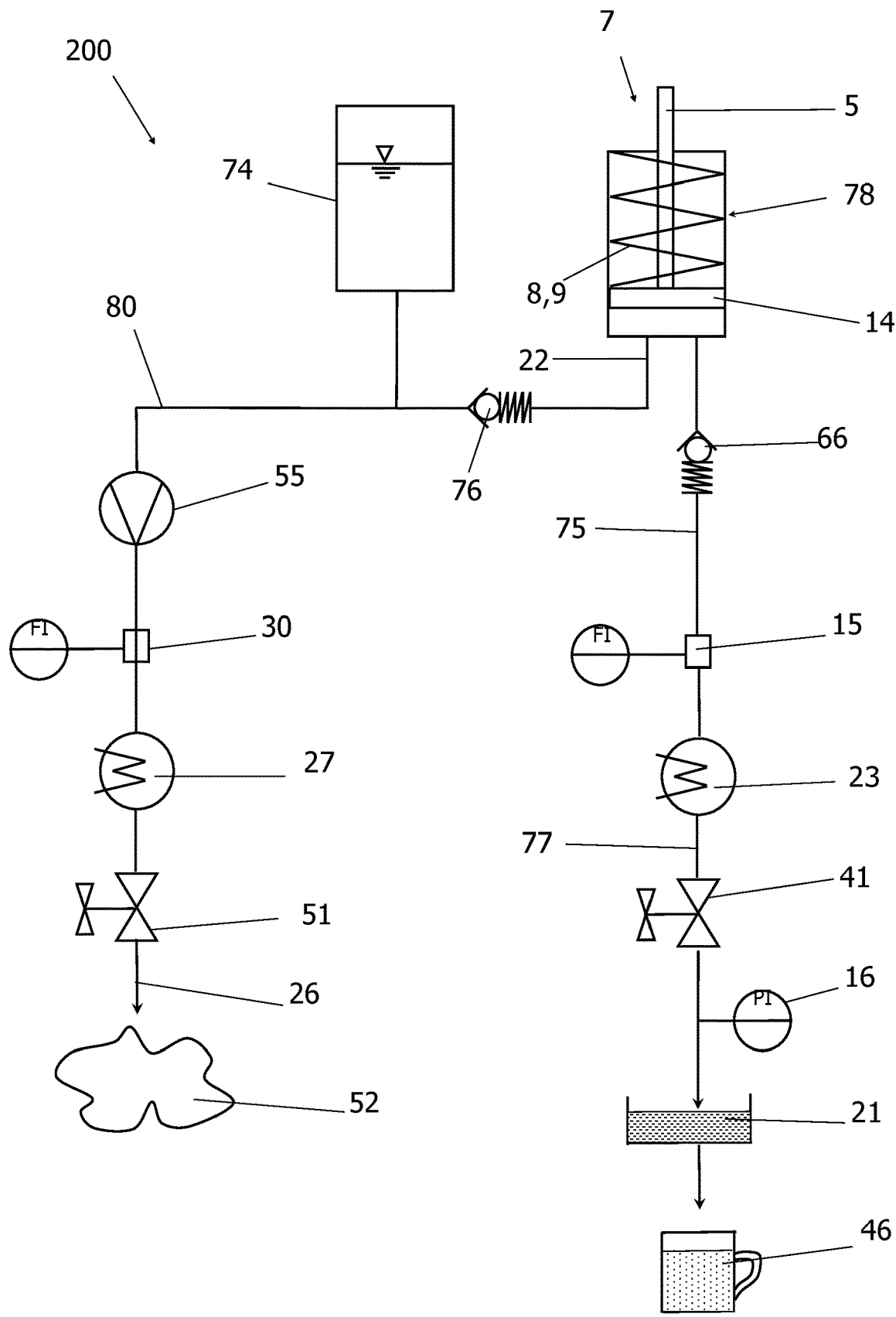

FIG. 8 shows a schematic illustration for a method carried out in a device 200 according to one of the preceding embodiments for the preparation of a hot beverage 46 or the preparation of steam 52.

The present device 200 has a water reservoir 7, which comprises a water tank 74 and a pressure vessel 78. The pressure vessel 78 can be designed as a cylinder. According to this exemplary embodiment, a check valve 76 is arranged between the pressure vessel 78 and the water tank 74. A piston 14, which can be designed according to one of the preceding exemplary embodiments, can be displaced in the pressure vessel 78. The piston 14 is connected to a piston rod 5, by means of which the piston 14 can be displaced in the pressure vessel 78. The piston 14 divides the interior of the pressure vessel 78 into a filling space and an empty space. The filling space can be filled with water from the water tank 74. The empty space can contain one or more spring elements 8, 9.

The filling space contains a connection element for water, which can reach the filling space via a water supply line from the water tank. The water is in particular neither heated in the water tank nor in the water supply line nor in the connection element 22. The water is pushed out of the filling space when the piston 14 moves towards the bottom dead center and thus the volume of the filling space decreases.

The water reaches the drain conduit 75 from the filling space, which leads to the flow heater 23. A flow sensor 15 is located in the drain conduit 75, by means of which the flow in the drain conduit 75 can be measured. A check valve 66 can be arranged in the drain conduit 75 between the filling space and the flow sensor 15. According to an exemplary embodiment, which is not shown, this check valve 66 can be omitted. In the flow heater 23, the water is heated to the brewing temperature. The brewing temperature can be preset by the user via an adjusting element 35 (see FIG. 2). The hot water generated in the flow heater 23 is supplied to the brewing device 40 via the hot water conduit 77.

The brewing device 40 comprises a brewing valve 41. The brewing valve 41 can be operated manually by the user, for example by means of the lever 45 shown in FIG. 2. According to this exemplary embodiment, a pressure sensor 16 is arranged between the brewing valve 41 and the carrier element 21, by means of which the pressure of the hot water located above the carrier element 21 can be measured. The pressure measured by the pressure sensor 16 can be displayed to the user, for example with the signal light shown in FIG. 1. The user can change the flow of the hot water through the brewing valve 41 according to the displayed pressure to allow the preparation of the hot beverage at the desired pressure. The hot water is conducted from the brewing valve 41 to a carrier element 21, for example a filter carrier or sieve carrier. In the carrier element 21 there is deposited a beverage preparation, for example coffee powder, so that a hot beverage 46 can be prepared, for example by extracting or dissolving constituents of the beverage preparation in the hot water.

Alternatively, steam can be generated with the device 200. To generate steam, cold water can be removed from the water reservoir 7, in particular from the water tank 74, according to the present exemplary embodiment.

The cold water is conducted in a fluid conduit 80 to a flow heater 27. A pump 55 can be arranged in the fluid conduit 80. A flow sensor 30 can also be arranged in the fluid conduit 80, in particular between the pump 55 and the flow heater 27.

The cold water is brought to evaporation in the flow heater 27. The steam generated in the flow heater 27 is fed through a steam valve 51 into a steam line 26. The steam line 26 can open into a nozzle from which the steam 52 emerges.

Figure 9:
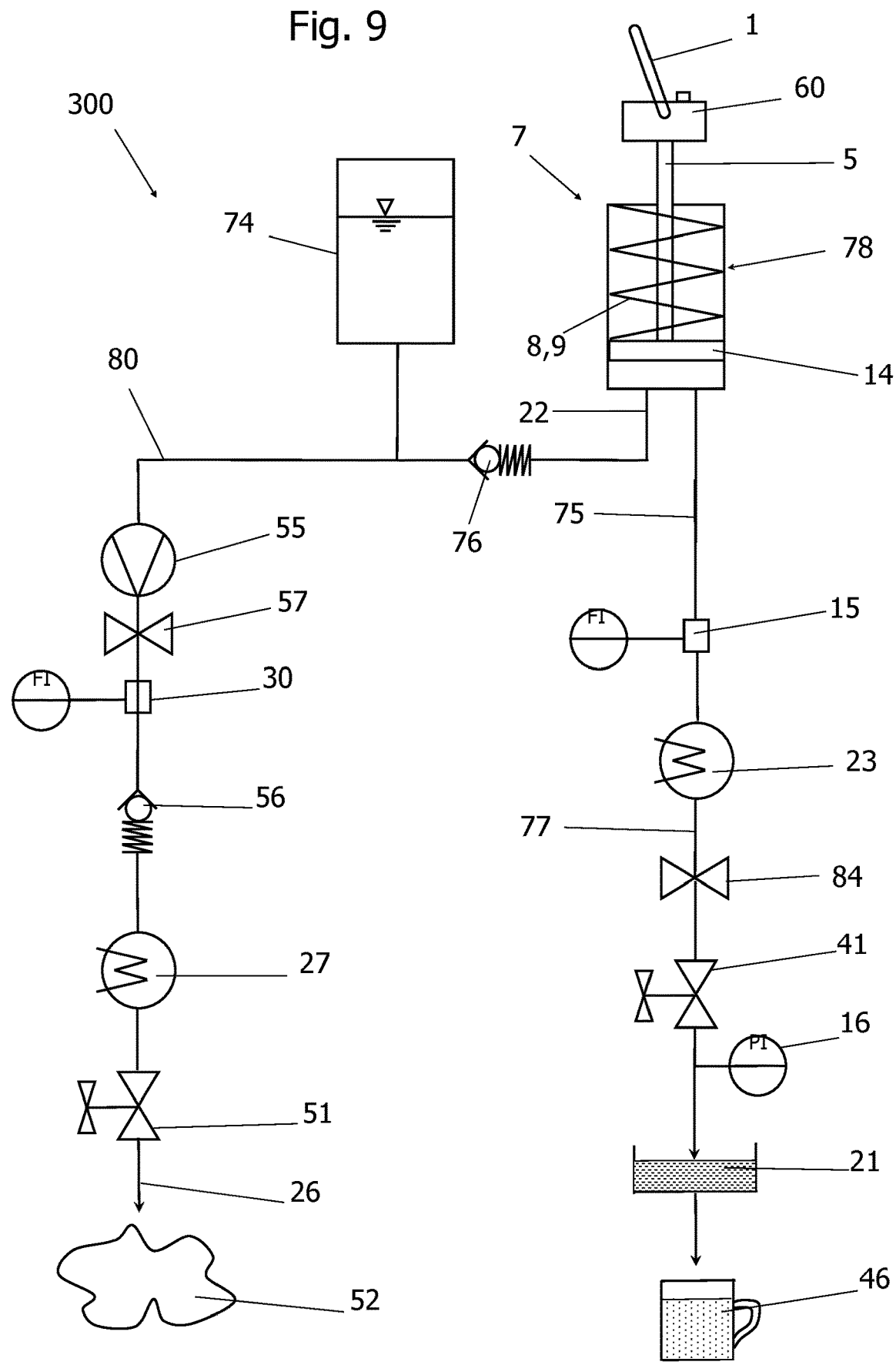

FIG. 9 shows a flow diagram for a method carried out in a device 300 according to one of the preceding exemplary embodiments for the preparation of a hot beverage 46 or the preparation of steam 52.

The present device 300 has a water reservoir 7, which contains a water tank 74 and a pressure vessel 78. The pressure vessel 78 can be designed as a cylinder. According to this exemplary embodiment, a check valve 76 is arranged between the pressure vessel 78 and the water tank 74. A piston 14, which can be designed according to any one of the preceding exemplary embodiments, can be displaced in the pressure container 78. The piston 14 is connected to a piston rod 5, by means of which the piston 14 can be displaced in the pressure vessel 78. In particular, the piston rod 5 can be connected to a swivel lever 1 via a gear 60, as described in the previous exemplary embodiments.

The piston 14 divides the interior of the pressure vessel 78 into a filling space and an empty space. The filling space can be filled with water from the water tank 74. The empty space can contain one or more spring elements 8, 9. The filling r space contains a connection element for water, which can reach the filling space via a feed line from the water tank 74. The water is in particular neither heated in the water tank nor in the water supply line nor in the connection element 22. The water is pushed out of the filling space when the piston 14 moves towards the bottom dead center and thus the volume of the filling space decreases.

The water reaches the drain conduit 75 from the filling space, which leads to the flow heater 23. A flow sensor 15 is located in the discharge conduit 75, by means of which the flow in the drain conduit 75 can be measured. In the flow heater 23, the water is heated to the brewing temperature. The brewing temperature can be preset by the user via an adjusting element 35 (see FIG. 2). The hot water generated in the flow heater 23 is supplied to the brewing device 40 via the hot water conduit 77.

According to this exemplary embodiment, a pressure relief valve 84 is arranged in the hot water conduit 77 between the flow heater 23 and the brewing valve 41.

The brewing device 40 comprises a brewing valve 41. The brewing valve 41 can be operated manually by the user, for example by means of the lever 45 shown in FIG. 2. According to this exemplary embodiment, a pressure sensor 16 is arranged between the brewing valve 41 and the carrier element 21, by means of which the pressure of the hot water located above the carrier element 21 can be measured. The pressure measured by the pressure sensor 16 can be displayed to the user, for example with the signal lamp shown in FIG. 1. The user can change the flow of the hot water through the brewing valve 41 according to the displayed pressure to allow the preparation of the hot beverage at the desired pressure. The hot water is conducted from the brewing valve 41 to a carrier element 21, for example a filter carrier or sieve carrier. In the carrier element 21 there is a beverage preparation, for example coffee powder, so that a hot beverage 46 can be prepared, for example by extracting or dissolving constituents of the beverage preparation in the hot water.

Alternatively, steam can be generated with the device 300. To generate steam, cold water can be removed from the water reservoir 7, in particular from the water tank 74 according to the present exemplary embodiment.

The cold water is conducted in a fluid conduit 80 to a flow heater 27. A pump 55 can be arranged in the fluid conduit 80. A flow sensor 30 can also be arranged in the fluid conduit 80, in particular between the pump 55 and the flow heater 27. A solenoid valve 57 can be arranged between the pump 55 and the flow sensor 30. According to this exemplary embodiment, a check valve 56 is arranged between the flow sensor 30 and the flow heater 27.

The cold water is brought to evaporation in the flow heater 27. The steam generated in the flow heater 27 is fed through a steam valve 51 into a steam line 26. The steam line 26 can open into a nozzle from which the steam 52 emerges. The steam generating device 50, see FIG. 5, can comprise a switch 28, by means of which the flow heater 27 can be switched on when the lever 25 attached to the steam valve 51 is actuated. Alternatively, a steam generating device 150 may be provided as described below.

Figure 10:
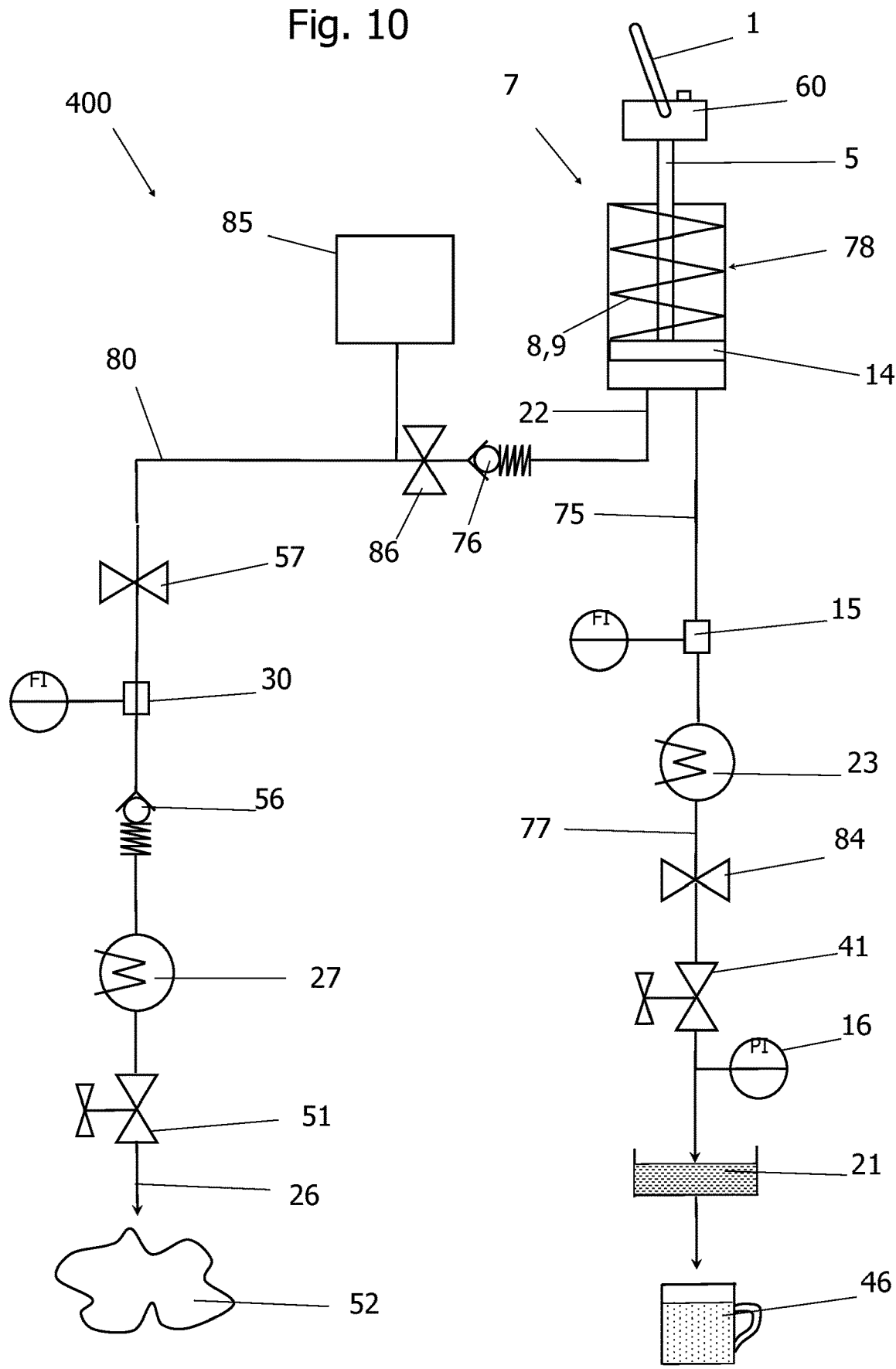

FIG. 10 shows a flow diagram for a method carried out in a device 400 according to any one of the preceding exemplary embodiments for the preparation of a hot beverage 46 or the preparation of steam 52.

The present device 400 has a water reservoir 7, which contains a water supply line 85 and a pressure vessel 78. The pressure vessel 78 can be designed as a cylinder. According to this exemplary embodiment, a check valve 76 is arranged between the pressure vessel 78 and the water supply line 85. In addition, a solenoid valve 86 is arranged between the check valve 76 and the water supply line 85. The solenoid valve 86 must be opened as soon as the swivel lever 1 is actuated in order to tension the spring elements 8, 9. As a result of the actuation of the swivel lever 1, a piston 14 can be displaced in the pressure vessel 78, which piston can be designed according to any one of the preceding exemplary embodiments. The piston 14 is connected to a piston rod 5, by means of which the piston 14 can be displaced in the pressure vessel 78. In particular, the piston rod 5 can be connected to a swivel lever 1 via a gear 60, as described in the previous exemplary embodiments.

The piston 14 divides the interior of the pressure vessel 78 into a filling space and an empty space. The filling space can be filled with water from the water supply line 85. The empty space can contain one or more spring elements 8, 9. The filling space contains a connection element for water, which can reach the filling space via a feed line from the water supply line 85. The water is in particular neither heated in the water supply line 85 nor in the feed line nor in the connection element 22. The water is pushed out of the filling space when the piston 14 moves towards the bottom dead center and thus the volume of the filling space decreases.

The water reaches the drain conduit 75 from the filling space, which leads to the flow heater 23. A flow sensor 15 is located in the drain conduit 75, by means of which the flow in the drain conduit 75 can be measured. In the flow heater 23, the water is heated to the brewing temperature. The brewing temperature can be preset by the user via an adjusting element 35 (see FIG. 2). The hot water generated in the flow heater 23 is supplied to the brewing device 40 via the hot water conduit 77.

According to this exemplary embodiment, a pressure relief valve 84 is arranged in the hot water conduit 77 between the flow heater 23 and the brewing valve 41.

The brewing device 40 comprises a brewing valve 41. The brewing valve 41 can be operated manually by the user, for example by means of the lever 45 shown in FIG. 2. According to this exemplary embodiment, a pressure sensor 16 is arranged between the brewing valve 41 and the carrier element 21, by means of which the pressure of the hot water located above the carrier element 21 can be measured. The pressure measured by the pressure sensor 16 can be displayed to the user, for example with the signal lamp shown in FIG. 1. The user can change the flow of the hot water through the brewing valve 41 according to the displayed pressure to allow the preparation of the hot beverage at the desired pressure. The hot water is conducted from the brewing valve 41 to a carrier element 21, for example a filter carrier or sieve carrier. The carrier element 21 contains a beverage preparation, for example coffee powder, so that a hot beverage 46 can be prepared, for example by extracting or dissolving components of the beverage preparation in the hot water.

Alternatively, steam can be generated with the device 400. To generate steam, cold water can be removed from the water reservoir 7, in particular from the water supply line 85 according to the present exemplary embodiment.

The cold water is conducted in a fluid conduit 80 to a flow heater 27. A flow sensor 30 can also be arranged in the fluid conduit 80, in particular between the water supply line 85 and the flow heater 27. A solenoid valve 57 can be arranged between the water supply line 85 and the flow sensor 30. According to this exemplary embodiment, a check valve 56 is arranged between the flow sensor 30 and the flow heater 27.

The cold water is brought to evaporation in the flow heater 27. The steam generated in the flow heater 27 is fed through a steam valve 51 into a steam line 26. The steam line 26 can open into a nozzle from which the steam 52 emerges. The steam generating device 50, see FIG. 5, can comprise a switch 28, by means of which the flow heater 27 can be switched on when the lever 25 attached to the steam valve 51 is actuated. Alternatively, a steam generating device 150 may be provided as described below.

The two exemplary embodiments according to FIGS. 9 and 10 can be arranged in the same device, so that the device can alternatively be supplied with water via a water tank 74 or a water supply line 85. For components for which an electrical control is provided, which is always triggered, so that the same control program can be used for each of the aforementioned exemplary embodiments.

Figure 11:
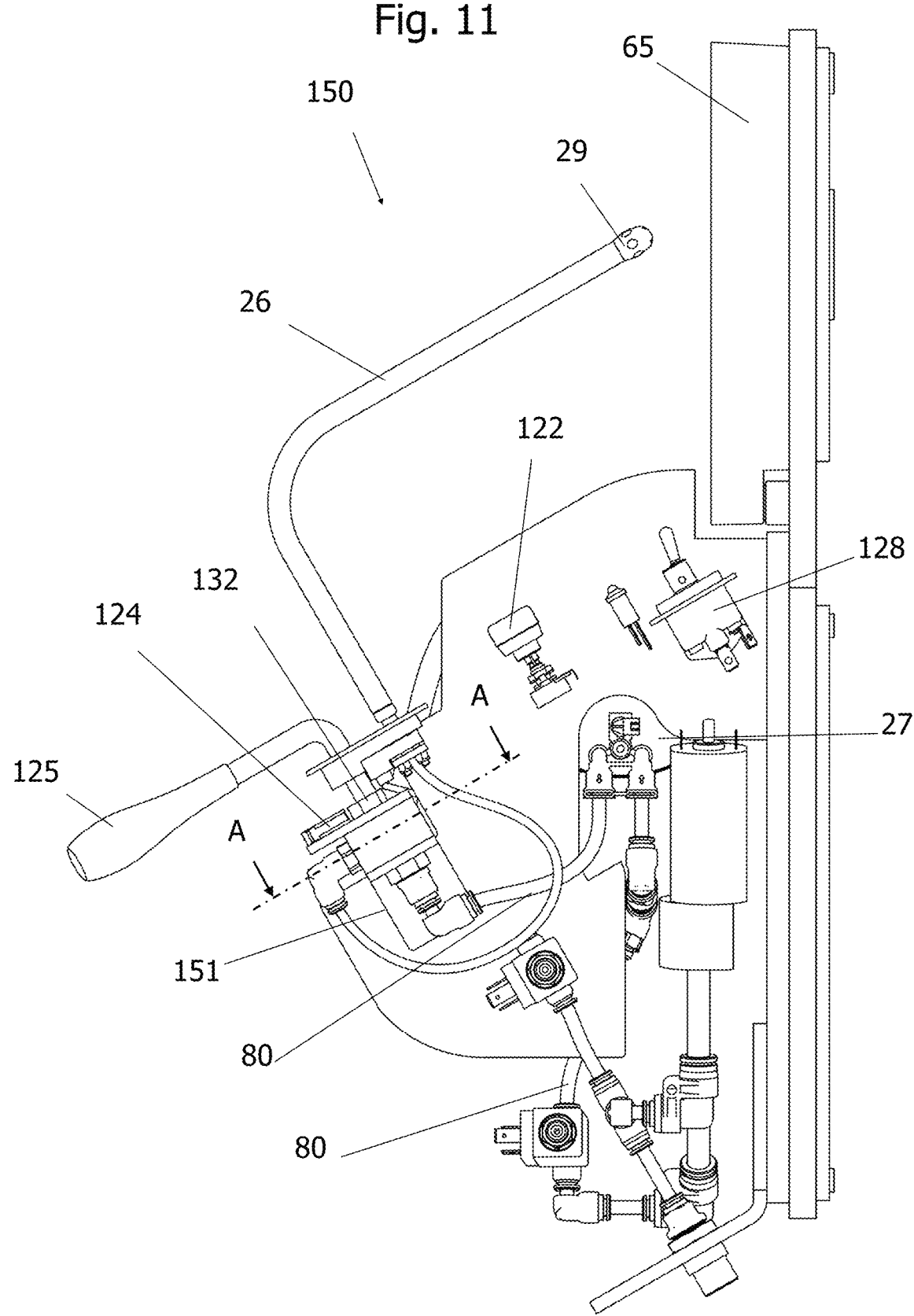

FIG. 11 shows a view of a variant for a steam generating device 150. The steam generation is started by actuating the switch 128. Alternatively, steam can also be generated automatically after the hot beverage has been prepared. As shown in one of FIGS. 8 to 10, a flow heater 27 provided for the steam generation is preheated. A fluid conduit 80 can lead from the water reservoir 7 to the flow heater 27 if the water reservoir 7 contains a water tank 74 or a water supply line 85. The flow heater 27 can be ready for operation within 3 seconds. The water can be supplied to the flow heater 27 by means of the fluid conduit 80. A pump can be used to increase the water pressure when the water needs to be pumped out of the water tank 74. Such a pump can also be started by operating switch 128. The fluid conduit 80 may include a steam valve 151 located downstream of the flow heater 27.

The steam generating device 150 comprises a lever 125 for the steam valve 151. By operating the lever 125, a hollow valve shaft 132 can be actuated, which is arranged in a valve body 131 of the steam valve 151. In particular, a rotary movement of the hollow valve shaft 132 is initiated by means of the lever 125. On the end of the hollow valve shaft 132, which is arranged opposite the lever 125, there is the steam inlet, that is to say the part of the fluid conduit 80 which leads from the flow heater 27 to the steam valve 151.

The hollow valve shaft 132 has openings which are in fluid-conducting contact with the steam line 26 or a drain line, not shown in FIG. 11, so that the rotational movement of the hollow valve shaft 132 results in a fluid-conducting connection from the inflow from the flow heater 27 to the steam line 26 or the drain line 126, see FIG. 12*a-c*. The steam can be passed through the steam line 26 and leaves it through a nozzle 29 or can be discharged through the drain line 126.

The amount of water flowing through the flow heater 27 is continuously measured by a flow sensor 30. The amount of heat required in the flow heater 27 is calculated by a processor on the basis of the amount of water measured by the flow sensor 30 and adapted accordingly. In order to provide steam, the water leaves the flow heater 27 in the vapor state, in particular it can be completely evaporated.

The steam line 26 is preferably made of a material with low thermal conductivity. For example, the steam line 26 can contain a plastic or consist of plastic. The water vapor temperature can be set and/or changed in accordance with a potentiometer 122. The temperature of the hot water, which is obtained via the steam line 26, can also be continuously adjusted within a certain range by means of the potentiometer 122. Thus, beverages can be prepared by means of the steam generating device, for which hot water of different temperatures is required, for example for the preparation of tea. In addition, the steam temperature can also be set using the potentiometer 122.

The flow heater 27 can be switched off automatically after a certain operating time. For example, the switch 128 can be a non-latching switch or button, which springs back into the original position immediately after actuation. With this non-latching switch 128, according to an embodiment not shown, only pulses can be made. A non-latching switch has a rest position, which can be switched into a switch position, but then springs back automatically into the rest position. One advantage of a system that includes a non-latching switch is that it saves electrical energy. With a non-latching switch, the automatic switch-off can be forced after a certain period of time, this period of time being very short.

Instead of a non-latching switch, a switch 128 can be used, by means of which hot water can be provided instead of steam by means of the steam generating device 50, for example for the preparation of tea beverages.

According to an exemplary embodiment not shown, the flow heater 27 can be switched off manually by the user actuating the switch 128, that is to say the energy supply to the heating elements of the flow heater can be interrupted. Any pump can also be switched off automatically or by operating switch 128. In particular, the flow heater 27 and/or the pump can be switched on or off by a pulse from the switch 128.

According to this exemplary embodiment, the switch 128 is designed as a rocker arm switch which can rest in two positions. The corresponding position is used to select which operating mode should be used by the steam generating device 150. In the "automatic" operating mode, the water in the flow heater 27 is automatically heated up after the preparation of a hot beverage has ended. In the "manual" operating mode, the energy supply to the flow heater 27 must be triggered manually accordingly. With a change in the switching state of the switch 128, however, there is no direct influence on the operating state of the flow heater 27, only the operating mode is specified. According to this exemplary embodiment, the position switch 124 on the steam valve 151 is required to activate the steam heating of the flow heater 27.

A display element 34 can be provided for displaying the operating state of the steam generating device 150, analogously to the exemplary embodiment shown in FIG. 1. For example, the display element 34 can be designed as a control lamp or signal lamp. The display element 34 can light up, for example, when the steam generating device 150 is in operation.

FIG. 12a shows a sectional illustration of the steam valve 151 for the steam generating device 150 according to FIG. 11 in a position in which steam is conducted into the drain line 126.

FIG. 12b shows a sectional illustration of the steam valve 151 for the steam generating device 150 according to FIG. 11 in a position in which steam is conducted through the steam line 26 into the steam lance to the nozzle 29 and at the same time into the drain line 126.

FIG. 12c shows a sectional illustration of the steam valve 151 for the steam generating device 150 according to FIG. 11 in a position in which steam is conducted through the steam line 26 into the steam lance to the nozzle 29.

The steam generating device 150 of FIG. 11 comprises a lever 125 for the steam valve 151. By operating the lever 125, a hollow valve shaft 132 can be actuated, which is arranged in a valve body 131 of the steam valve 151. In particular, a rotary movement of the hollow valve shaft 132 is initiated by means of the lever 125. On the end of the hollow valve shaft 132, which is arranged opposite the lever 125, there is the steam inlet, that is to say the part of the fluid conduit 80 which leads from the flow heater 27 to the steam valve 151.

The hollow valve shaft 132 has openings which are in fluid-conducting contact with the steam line 26 or the drain line 126, so that the rotational movement of the hollow valve shaft 132 results in a fluid-conducting connection from the inflow from the flow heater 27 to the steam line 26 or the drain line 126, see FIG. 12a-c, can be released. The steam or hot water can be passed through the steam line 26 and leaves it through a nozzle 29 or can be discharged through the drain line 126.

According to the present exemplary embodiment of the steam generating device 150, a pressure relief valve can be dispensed with, since the hollow valve shaft 132 has a small swivel range, so that steam or hot water can enter the steam line 26 and the drain line 126 at the same time. According to this exemplary embodiment, overpressure can no longer be built up in the system, so that the overpressure valve can be dispensed with.

The steam valve 151 is constructed in such a way that both outlet lines are never closed at the same time, as can be seen from FIGS. 12a-12c. This means that no pressure can build up between the steam valve 151 and the fluid conduit 80, which makes it possible to dispense with a pressure relief valve. The drain line 126 into the drip tray 65 is required in order to be able to discharge water or steam during the preheating phase. The water used for consumption, which may be in the form of hot water or steam, is obtained exclusively via the steam lance containing the steam line 26.

Figure 13:
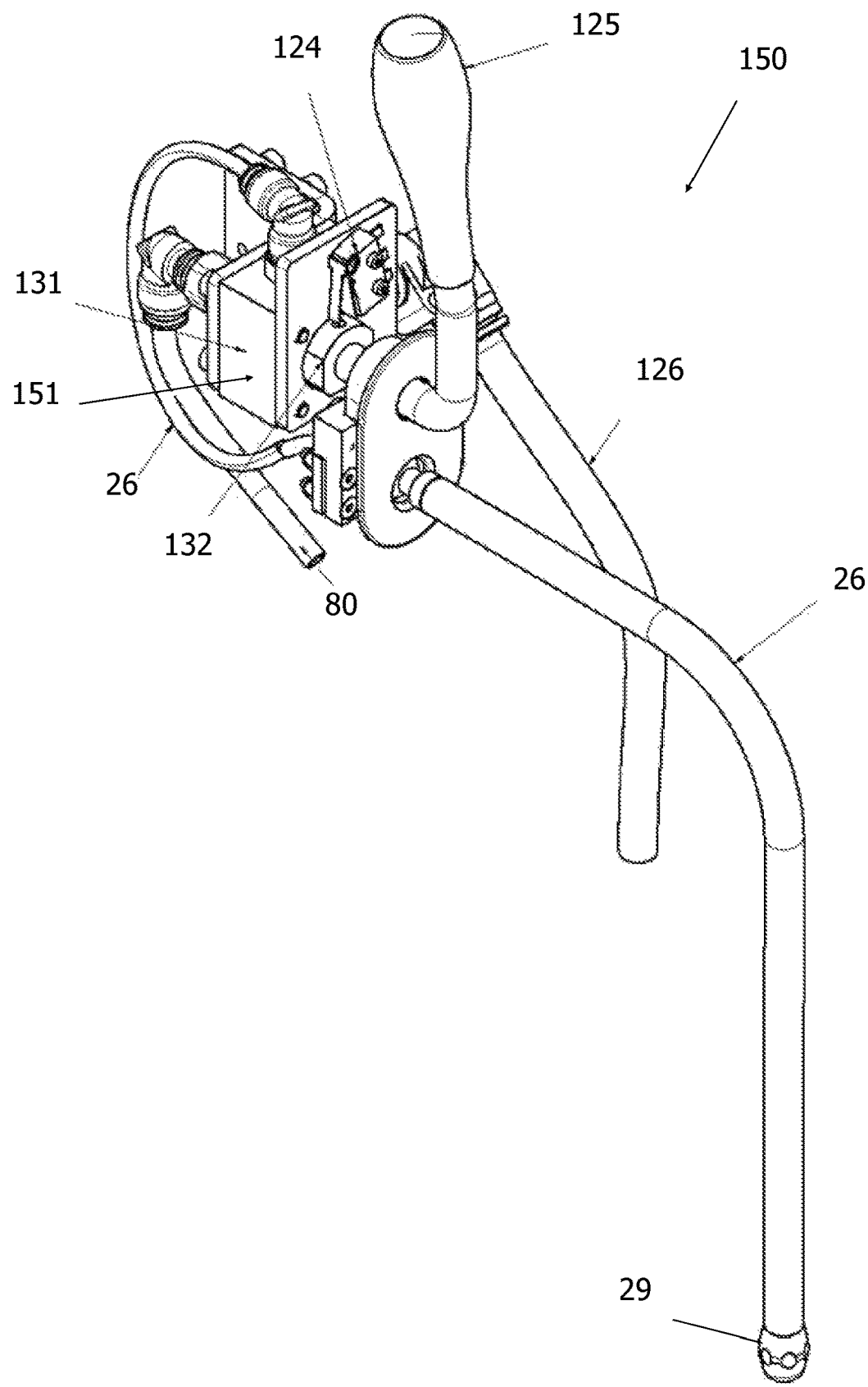

FIG. 13 shows a perspective view of the steam generating device 150, the flow heater 27 to which the fluid line 80 leads being omitted for the sake of simplicity.

The steam valve 151 or the lever 25 is equipped with a position switch 124, which detects when the steam valve 151 is closed or is in a rest position. That is, the flow heater 27 is switched on at the moment when the lever 25 is rotated somewhat from the rest position. With the position switch 124, the flow heater 27 is thus switched on or off depending on the position of the lever 25.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of an element or compound selected from the group consisting of A, B, C . . . and N, the text should be interpreted as requiring only one element from the group, not A plus N, or B plus N, etc.

What is claimed is:

1. A device for preparation of a hot beverage comprising a water tank, a flow heater and a brewing device, the water tank having a connection element for cold water, wherein the water tank is fluidly connected to the flow heater, so that the flow heater is configured to be filled with the cold water from the water tank, wherein the water tank comprises a tank bottom, a tank jacket and a tank lid, wherein a piston in the water tank is movable by a user between a top dead center and a bottom dead center, wherein the piston is movable by a swivel lever actuated by the user, wherein the water tank contains a filling space for the cold water, which is arranged between the piston and the tank bottom when the piston is not located in the bottom dead center, wherein the filling space is fluidly connected to the flow heater, wherein the flow heater is configured to be filled with a portion of the cold water leaving from the filling space, wherein the brewing device further includes a carrier element for the deposit of a beverage preparation and a brewing space configured to receive the carrier element, wherein the carrier element contains one of a filter carrier or a sieve carrier arranged in the brewing space, wherein the flow heater comprises a heated channel containing at least one heating element, wherein heat is transferred to the cold water from the at least one heating element, wherein the at least one heating element is arranged on or in a channel wall of the flow heater, wherein the at least one heating element is configured to transfer the heat the portion of the cold water flowing in the heated channel of the flow heater, wherein the flow heater is disposed adjacent to a sidewall of the water tank and above a top portion of the carrier element so that hot water heated by the at least one heating element is conducted to the carrier element for the preparation of the hot beverage.

2. The device of claim 1, wherein one of the connection element or an inlet conduit for filling the filling space with the cold water is arranged upstream of the filling space.

3. The device of claim 2, wherein a check valve is arranged in the connection element or in the inlet conduit.

4. The device of claim 1, wherein the brewing device includes a brewing valve.

5. The device of claim 4, wherein the brewing valve comprises a pressure sensor or a pressure sensor is arranged downstream of the brewing valve.

6. The device of claim 4, wherein the brewing valve comprises a valve body and a valve rod, wherein the valve rod is configured to be connected to a lever which is configured to be operated manually by the user to set a desired flow in the brewing device.

7. The device of claim 1, wherein a piston rod is provided and the piston is attached at a lower end of the piston rod.

8. The device of claim 7, wherein the piston rod comprises an upper end, which is connected to the swivel lever in such a way that the piston rod is configured to be moved relative to the water tank by actuating the swivel lever.

9. The device of claim 8, wherein the swivel lever contains a gear.

10. The device of claim 9, wherein the gear is in engagement with a rack.

11. The device of claim 10, wherein a tooth rocker is arranged between the gear and the rack to transmit a movement from the gear to the rack.

12. The device of claim 7, wherein the piston rod comprises an upper end which contains a rack.

13. The device of claim 1, wherein a spring element is arranged in the water tank between the tank lid and the piston.

14. The device of claim 1, wherein the device comprises a steam generating device for generating steam.

15. The device of claim 1 comprising a water reservoir comprising the water tank and a pressure vessel or a water supply line.

* * * * *